(12) United States Patent
Anderson

(10) Patent No.: US 7,397,615 B2
(45) Date of Patent: Jul. 8, 2008

(54) DIRECTING ELECTROMAGNETIC ENERGY FROM AN AREA OR VOLUME SOURCE

(76) Inventor: John Ernest Anderson, 75 Craigmount Avenue North, Corstorphine, Edinburgh (GB) EH4 8DT ( * ) Notice: Subject to any disclaimer, the term of this patent is extended or adjusted under 35 U.S.C. 154(b) by 226 days.

(21) Appl. No.: 11/416,123

(22) Filed: May 3, 2006

(65) Prior Publication Data
US 2006/0279859 A1 Dec. 14, 2006

(30) Foreign Application Priority Data
Jun. 10, 2005 (GB) .................................... 0511783

(51) Int. Cl.
*G02B 17/00* (2006.01)
*G02B 5/10* (2006.01)

(52) U.S. Cl. ................. 359/730; 359/850; 359/858

(58) Field of Classification Search ......... 359/726–727, 359/730, 850–852, 856, 858, 861, 863
See application file for complete search history.

(56) References Cited

U.S. PATENT DOCUMENTS

| 3,711,188 | A | * | 1/1973 | Zehnpfennig | ................ 359/730 |
| 3,986,490 | A | | 10/1976 | Chao et al. | |
| 5,272,570 | A | * | 12/1993 | Yoshida et al. | ............... 359/853 |
| 5,818,649 | A | | 10/1998 | Anderson | |
| 6,169,637 | B1 | * | 1/2001 | Tsunashima | ................ 359/726 |

OTHER PUBLICATIONS

Welford, W.T. & Winston, R. High Collection Nonimaging Optics 1989, pp. 54-62, 100-108, 263-266.

Dawson, F.P. & Yan, W., Factors Influencing the Minimum Arc Sustaining Electric Field and Associated Current for a High-Pressure Vortex-Water -Wall-Arc Lamp, IEEE Trans. Ind. Applicat., vol. 39, No. 1, Jan./Feb. 2003, p. 128.

Yan, W. & Dawson, F.P., Factors Influencing the Minimum Arc Sustaining Electric Field and Associated Current for a High-Pressure-Vortex-Water-Wall-Arc Lamp, Conf. Rec. of 1988 IEEE Industry Applications Conference 33$^{rd}$ IAS Ann. Mtg. vol. 3, p. 2164 (earlier version of the above).

Yan, W. & Dawson, F.P., DC Ignition Circuits for a High Pressure Vortex-Water Wall Argon Arc Lamp, Conf. Rec. IEEE-IAS Ann. Mtg. 1996 vol. 4, p. 2211.

Yan, W. & Dawson, F.P. Power Supply Design Considerations for Maintaining a Minimum Sustaining Current in a Vortex Water Wall High-Pressure Argon Arc Lamp, IEEE Trans. Ind. Applicat., vol. 34, No. 5, Sep./Oct. 1998, p. 1015.

(Continued)

*Primary Examiner*—Jordan M Schwartz
(74) *Attorney, Agent, or Firm*—Bacon & Thomas, PLLC

(57) ABSTRACT

An eye mirror in which a first defining ray 5 is reflected from a further defined mirror 2 and intersects a fixed defined unit 75 at a respective further point 8 within a circular cone 91 defined by the angular input aperture at that point. A second defining ray 6 is reflected from said further defined mirror 2 and intersects the fixed defined unit 75 at a respective further point 10 within a circular cone 92 defined by the angular input aperture at that point. There are two such defining rays for every point on the further defined mirror. The further defined mirror 2 lies outside the aperture described by the leading edge 147 of the first stage defining mirror 30 and is axially symmetric about the axis of symmetry 18.

30 Claims, 12 Drawing Sheets

OTHER PUBLICATIONS

Dawson, F.P. & Yan, W. Modeling the Breakdown Process in a Vortex-Water-Wall-High-Pressure-Argon-Arc Lamp, Conf. Rec. Of 1999 IEEE Industry Applications Conference 34th IAS Ann. Mtg. vol. 1, p. 618.

Kouroussis, D. et al Experimental Results for a Pulsed Vortex Water Wall High Pressure Argon Lamp, Conf. Rec. of 1999, IEEE Industry Applications Conference 34th IAS ann. Mtg. vol. 1, p. 606.

* cited by examiner

DIRECTING ELECTROMAGNETIC ENERGY FROM AN AREA OR VOLUME SOURCE

1.0 BACKGROUND TO THE INVENTION

This invention relates to a method and apparatus for directing electromagnetic energy, and in particular, but not exclusively, to such a method and apparatus for use in the fields of defence as a directed energy weapon, means of illumination for an active sensor and/or guidance system, countermeasure, or to ignite a fusion weapon; power transmission by means of a beam; propulsion by means of a beam or inertial fusion; power generation from inertial fusion; or telecommunications.

2.0 PRIOR ART

The prior art comprises United Kingdom patent GB 2,305,516 B published as an application on the 9$^{th}$ Apr. 1997 and as a patent on the 7$^{th}$ Apr. 1999, and granted to the present inventor, which revealed method and apparatus for directing electromagnetic energy from an area or volume source. Its co-owned counterpart, U.S. Pat. No. 5,818,649, is incorporated herein by way of reference. As the present invention is limited to those embodiments of said patents in which all the optical surfaces are reflective and axially symmetric about a common axis of symmetry, and in which each pair of defining rays whose intersection specifies a point on a defined mirror lie entirely in a respective plane through that axis of symmetry, such an apparatus will hereinafter be referred to as an "eye mirror". It equally follows that any ray in the plane containing a pair of defining rays also lies in a plane through the axis of symmetry and is therefore meridional.

GB 2,305,516 B inter alia revealed an eye mirror with multiple sources, including the circular array of plasma arcs 111, shown in its FIG. 63. Electromagnetic energy from that circular array of plasma arcs passed into the input aperture of the first stage of that eye mirror either directly, or indirectly after reflection from a further mirror 112 in the form of a cylinder or a truncated cone. As the input aperture of such an eye mirror may comprise an annulus as in FIG. 15, or a portion of the surface of a cone as in FIGS. 14, 16 and 18, of GB 2,305,516 B, the circular array was not restricted to the surface of a cylinder as shown in FIG. 63.

3.0 OBJECTS OF THE INVENTION

It is an object of the present invention to modify the design of small eye mirrors so as to accommodate longer, and thus more efficient, plasma arcs within them.

It is desirable to minimise the size, weight and cost of an eye mirror fitted to a combat vehicle or aircraft. As there is a lower limit to the thickness of a mirror, particularly when it has to be cooled by the flow of a liquid, it is advantageous to reduce the number of stages which a small eye mirror has in parallel.

If an inner final stage is a scaled down version of an outer final stage, the axial movement required of the defined mirror in the inner final stage to achieve a partial focus at a given range scales down in proportion. So that the inner final stage defined mirror cannot be controlled by the moving tripod for the outer final stage defined mirror as accurately. In which case, it may be necessary to fit an eye mirror with more than one moving tripod.

The weight, cost and complexity of an eye mirror increase with the number of mirrors and moving tripods in it. This invention particularly relates to eye mirrors with one, or a small number, of stages in parallel.

It is a further object of the present invention to minimise the size, weight, cost and complexity of eye mirrors.

Badly directed rays in an eye mirror fall into three categories. Some rays bounce round the inside of one or more of the defining mirrors until they exit that device with an excessive output angle. Some rays bounce round the inside of one or more of the defining mirrors until they are incident to one of the defined mirrors, and undergo one or more pairs of reflections from a defined and a defining mirror. Other rays are turned back towards the axis of symmetry of the device by successive pairs of reflections at defining and defined mirrors, or vice versa, and become trapped inside the device, eventually returning to the source of the rays. It should be mentioned that such trapping may, however, be used to reduce the stray light output from the device. The further the surface of that source lies from that axis of symmetry, the less reflections are required for a ray with a particular starting position and direction to escape from the device. And the less the proportion of rays becoming trapped inside the device.

A large gap between the defining and defined mirrors increases the proportion of rays bouncing round the inside of the defining mirrors, but decreases the proportion of rays becoming trapped inside the device. A small gap reduces the proportion of rays bouncing round the inside of the defining mirrors, but increases the proportion of rays becoming trapped inside the device. If the device has an input aperture, it often consists of the gap between the leading edge of the outermost first stage defining mirror and that of the innermost first stage defined mirror. In existing designs of eye mirrors, the length of the plasma arc, or arcs, which may be accommodated inside the device is limited by the size of that input aperture.

It is a further object of the present invention to reduce the proportion of badly directed rays within an eye mirror without reducing the length of the plasma arc, or arcs, within it. It should be mentioned that not very well directed rays may be useful: for instance to pre-heat the area round a spot on a target which is subject to jitter.

It was shown in Sections 6.14.3.5.1 and 6.14.3.5.2.1 of GB 2,305,516 B that each stage of an eye mirror improves the direction, and thus the meridionality, of a ray lying outside any of the planes containing a pair of defining rays, and thus being non-meridional, according to an approximation which improves as such rays become more meridional.

It is a further object of some embodiments of the present invention to provide means to limit the non-meridionality of rays emitted from a circular array of plasma arcs within an eye mirror and thus improve the direction of such rays.

4.0 SUMMARY OF THE INVENTION

In view of the foregoing, a first aspect of the present invention provides a method and apparatus for directing electromagnetic energy comprising an eye mirror with at least one first stage, with both a defining mirror and a defined mirror, each of which are axially symmetric about the common axis of symmetry of that eye mirror, and at least one source extending over an area or volume in which that source extends outside the aperture described by the leading edge of the, or the outermost, first stage defining mirror and a further defined mirror lies outside that aperture, a pair of defining rays respectively emanating from different points on or within said extended source and meeting at a point of intersection on that further defined mirror, each of said defining rays being of a defining wavelength, $\lambda$, said first defining ray being reflected from said further defined mirror and intersecting one of the defined mirrors of the eye mirror at a respective further point within the cone defined by the angular input aperture at that point, and said second defining ray being reflected from said further defined mirror and intersecting one of the defined mirrors of the eye mirror at a respective further point within the cone defined by the angular input aperture at that point, there being two such defining rays for every point on the further defined mirror. Such a cone is shown in FIG. 26A of GB 2,305,516 B and U.S. Pat. No. 5,818,649 as the circular cone 206.

In a first embodiment there is provided an apparatus in which there is only one area or volume source whose length lies along the axis of symmetry of the eye mirror, the further defined mirror is axially symmetric about that axis, and each pair of defining rays whose intersection specifies a point on that further defined mirror lie entirely in a respective plane through that axis of symmetry.

In some other embodiments there is provided an apparatus in which there are multiple sources arranged as a circular array on the surface of a cylinder or cone axially symmetric about the axis of symmetry of the eye mirror, each of which sources extends outside the aperture described by the leading edge of the, or the outermost, first stage defining mirror.

5.0 DESCRIPTION OF DRAWINGS

FIG. 1 is a schematic diagram of an eye mirror with a source extending outside the aperture described by the leading edge of its first stage defining mirror and a further defined mirror according to the present invention.

FIG. 2 is a schematic diagram of an eye mirror according to GB 2,305,516 B and U.S. Pat. No. 5,818,649 with certain additions which illustrate the arrangement when the surface of its source lies near its axis of symmetry.

Figure 1:
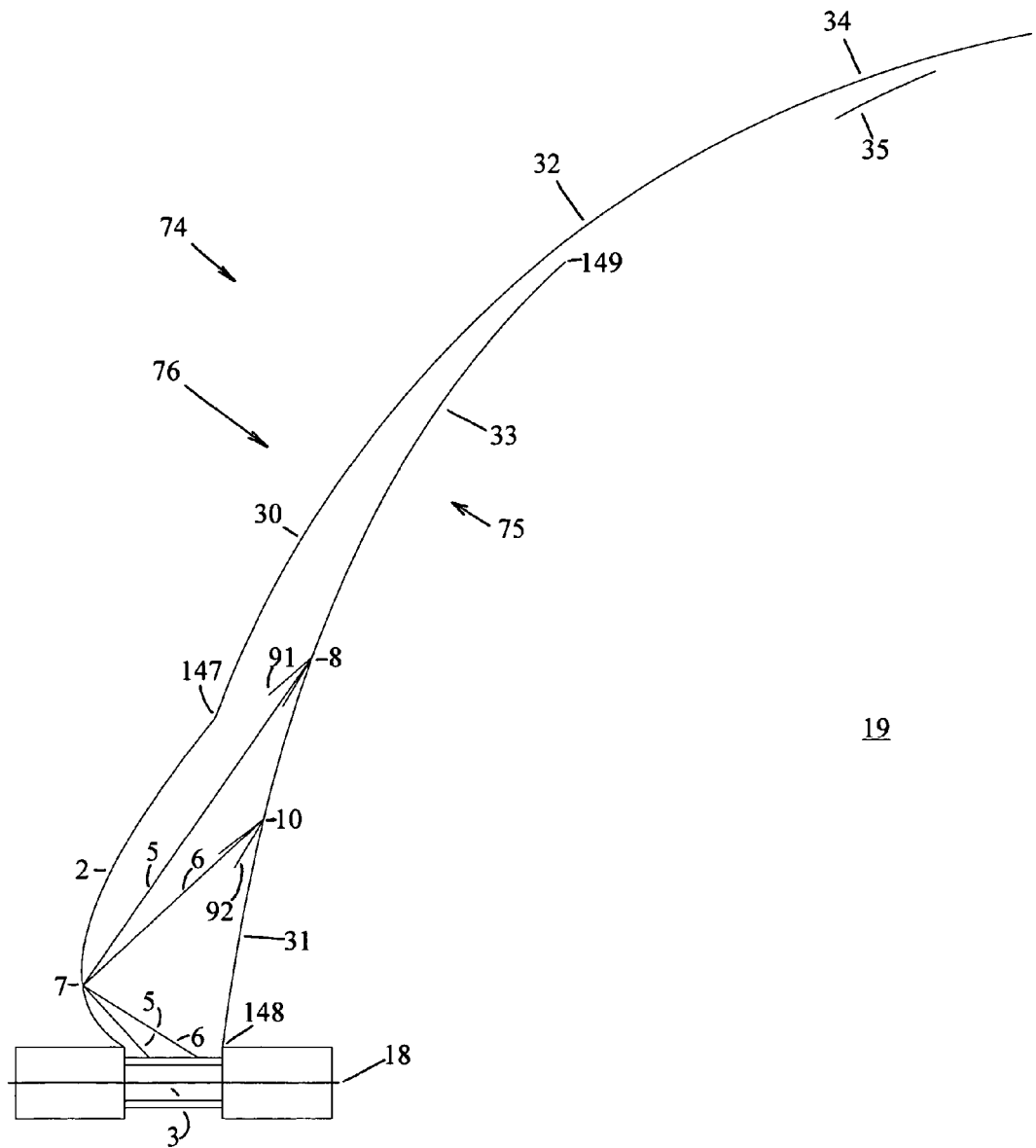

6.0 DESCRIPTION OF EMBODIMENTS OF THE INVENTION 6.1 Efficiency of Plasma Arcs as a Function of Their Length and Pressure.

In the simplest one-dimensional model of an arc, the potential fall, V, between the electrodes of an arc is made up of three components:—the cathode fall $(1-\epsilon)\alpha$, the anode fall $\epsilon\alpha$, and the potential fall along the length of the positive column of the arc $\gamma l$ where l is the length of the arc (which is only slightly greater than the length of that column) and the remaining symbols are constants. Both $\alpha$ and $\gamma$ are dependent on the nature of the electrodes and the gas through which the discharge passes, and $\epsilon \approx 0.8$. Hence:

$$V=(1-\epsilon)\alpha+\epsilon\alpha+\gamma l$$

Almost all of the electromagnetic energy output from the arc is emitted from the positive column. So that the maximum efficiency of an arc lamp is less than $\gamma l/V$ which increases with l.

Moreover, some of the electromagnetic energy emitted will be absorbed by the anode and cathode assemblies. The proportion of the total energy output so absorbed will reduce as l, and the curved surface and volume of the arc, increase.

A paper entitled "Factors Influencing the Minimum Arc Sustaining Electric Field and Associated Current for a High-Pressure-Vortex-Water-Wall-Arc Lamp" (F. P. Dawson and W. Yan, IEEE Trans. Ind. Applicat., vol. 39, No. 1, January/February 2003 p. 128) described a one-dimensional model for water-wall arc lamps once the arc had been established. This paper included calculation results of the Voltage-Current (V–I) characteristic for lamps of three different tube radii, each at three different high pressures. It also gave experimental results for a lamp with one of those tube radii at three different high pressures.

The electric field in the positive column of the arc, in volts/cm, increased with pressure, and decreased with increased tube radius, over the entire current range used, for all these results. The experimental value for the electric field, E, of the positive column was obtained by subtracting 15 volts from the measured voltage, V, to compensate for the total cathode and anode voltage drops. The net voltage was then divided by the length of the positive column, l, to give E. This assumed V=15+El.

The results can be regarded as a three stage process as the current in the arc increases.

At very low currents, the arc does not fill the tube. Higher current initially causes a higher current density, which heats the positive column. The resulting higher temperature arc not only has a lower resistivity, because of the higher degree of ionisation of the gas in the arc, but also increases in radius, because of the higher temperature at its periphery. Its lower resistivity and its larger cross-sectional area combine to lower the overall impedance of the discharge so that the voltage drop between the electrodes decreases. The ratio of the change in voltage to that of the change in current, $\Delta V/\Delta I$, known as the dynamic impedance, is therefore negative. Equally, the slope of the V–I characteristic is negative.

This stage continues until the arc has expanded sufficiently to be constricted by the water-wall. A further increase in current raises the temperature of the arc, increasing its ionisation and electrical conductivity. Higher conductivity, and thus lower resistivity, implies higher current for a given electric field. The slope of the V–I characteristic therefore remains negative.

As the core temperature of the arc increases, and the radiation from it becomes significant, the radiation heats the outer layers of the arc, and the temperature gradient across its radius decreases. Conduction from the inside to the outside of the arc decreases. The radiation removes energy from the arc, reducing its temperature for any given current, so that the rate of increase of the electrical conductivity is reduced as the arc current increases. The slope of the V–I characteristic thus becomes positive. Lamps operated in this condition do not require a ballast resistance, which would otherwise reduce the efficiency of the lamp.

In practice, water-wall arc lamps are run at higher currents than shown in the results in this paper.

This paper also includes calculations of the energy distribution in terms of power density as a function of the radial position across the arc, for the lamps of all three tube radii, each at three different high pressures. The area under the radiation curve increases with pressure in relation to that under the conduction curve for all three lamps: so that the proportion of the energy input, which is output as radiation, increases with pressure.

Hence longer water-wall arc lamps are more efficient; as are such lamps when run at a higher pressure, and thus gas density. It is known that the gas pressure in a water-wall arc lamp may be varied between 2 and 50 atmospheres. Commercially available water-wall arc lamps are run at 7 atmospheres and obtain efficiencies of 55% for arc lengths of 150 mm.

6.2 Meridionality of Rays.

6.2.1 Single Source Along the Axis of Symmetry.

Figure 3:
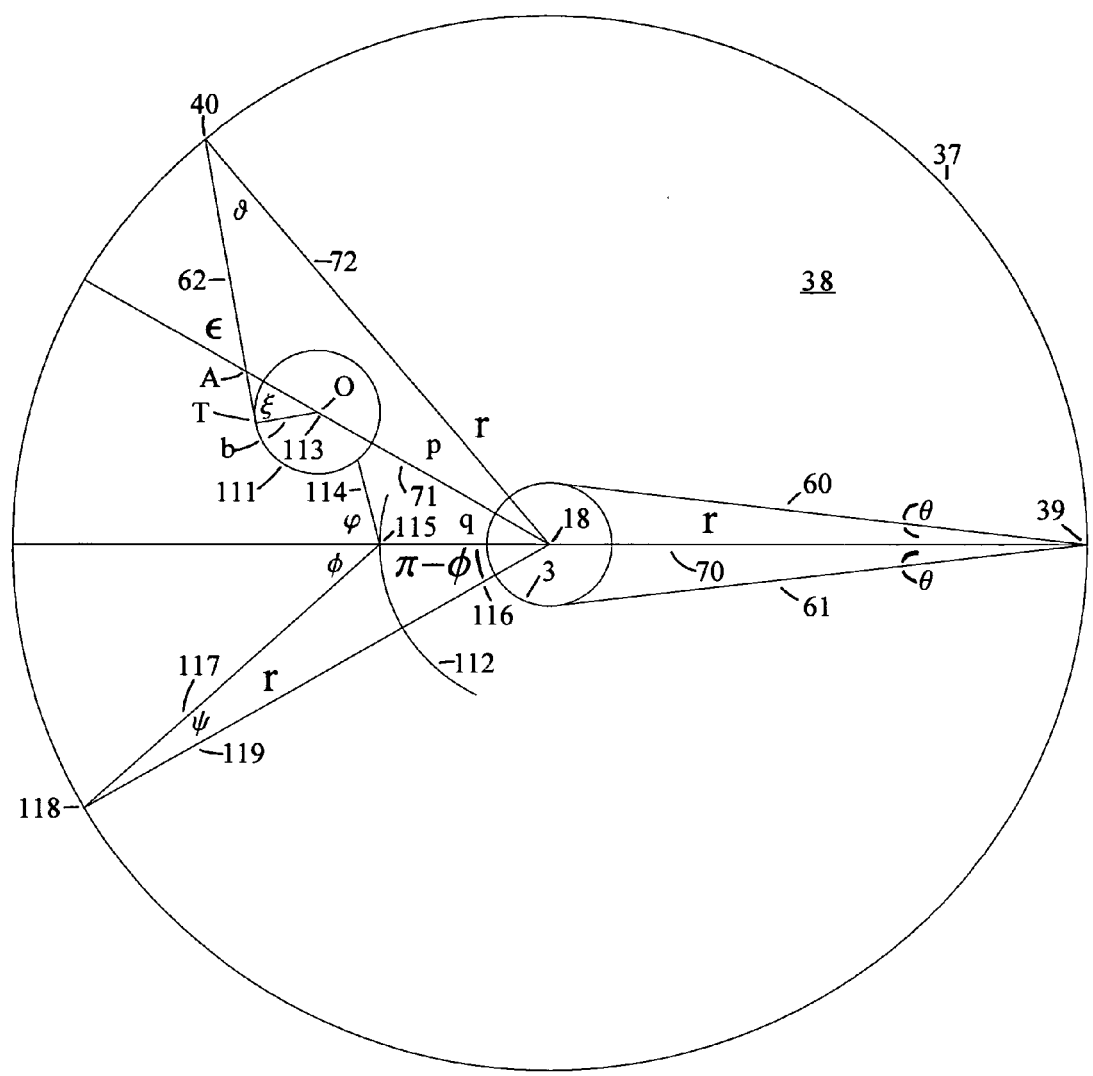
FIG. 3 is a schematic diagram illustrating the geometric relationship governing the meridionality of rays emitted from a source for two possible positions of that source, and of rays from a source in one of those positions which are reflected by a further mirror.

FIG. 3 shows a section of a concave mirror 37 and a source 3, which are both axially symmetric about an axis of symmetry 18, in a plane 38 at right angles to that axis. The intersection of the surface of the mirror, and that of the surface of the source, with this section are therefore both circles.

A ray 60 is emitted tangentially from the source 3 in the plane 38 of the paper, and is incident to the concave mirror 37 at a point 39. A radius vector 70 of length r is drawn from the axis of symmetry 18 to the point 39. This radius vector is also the projection on the plane 38 of the paper of the normal to the surface of the concave mirror 37 at the point 39. The projection of the angle of incidence of the ray 60 at the point 39 on the plane of the paper is θ. As r increases, θ decreases: so that the ray 60 tends towards the meridional as r increases.

This relationship also holds for a tangentially emitted ray not in the plane of the paper. Similarly if a convex mirror was substituted for the concave mirror 37.

If the normal to the surface at the point 39 lies in the plane of the paper, the ray 60 will be reflected by the concave mirror 37 as the ray 61 which will also lie in the plane of the paper. As the angles of incidence and reflection must both be equal to θ, the reflected ray 61 will be tangential to the source 3.

As the ray 60 rotates away from the tangential while remaining in the plane of the paper, the ray 60 and the radius vector 70 become closer, and the angle θ decreases: so that the ray 60 tends towards the meridional, and the reflected ray 61 intersects the source 3 nearer to the radius vector 70. Thus all those rays within the plane of the paper are returned to the source after only one reflection, provided the normal at the point 39 lies in the plane of the paper. Moreover, as r increases, θ decreases, as before. These relationships also hold for a ray not in the plane of the paper.

Clearly this relationship will be maintained if both the ray 60 and the normal to the surface at the point 39 lie in a plane of reflection through an axis in the plane 38 of the paper at a right angle to the radius vector 70. But otherwise a ray not in the plane of the paper may be reflected so as to miss the source. Similarly if the normal to the surface at the point 39 does not itself either lie in the plane of the paper or such a plane of reflection.

6.2.2 Circular Array of Plasma Arcs.

FIG. 3 also shows a plasma arc 111 which is axially symmetric about an axis 113 through the point O, which lies at a distance p from the axis of symmetry 18 along a radius vector 71 in the plane 38 of the paper. A ray 62 is emitted tangentially in the plane of the paper from a point T on the plasma arc 111, and is incident to the concave mirror 37 at a point 40.

The length of OT is b. The angle ∠OTA is ξ. If the axis 113 is parallel to the axis of symmetry 18 then b is the radius of the plasma arc 111 and $$\xi = \frac{\pi}{2}$$

since the radius to, and the tangent at, any point on a circle are perpendicular.

The angle between the ray 62 and the radius vector 71 is ε. They intersect at the point A so that by the Law of Sines:

$$\frac{OA}{\sin\xi} = \frac{b}{\sin\epsilon} \text{ or } OA = \frac{b\sin\xi}{\sin\epsilon}$$

A radius vector 72 in the plane of the paper is drawn from the axis of symmetry 18 to the point 40. The angle of incidence of the ray 62 at the point 40 is ϑ. By the Law of Sines:

$$\frac{p + \frac{b\sin\xi}{\sin\epsilon}}{\sin\vartheta} = \frac{r}{\sin(\pi - \epsilon)}$$

$$\sin\vartheta = \frac{p}{r}\sin\epsilon + \frac{b\sin\xi}{r}$$

If the axis 113 lies in a plane through the axis of symmetry 18 but is not parallel to it, then the section of the plasma arc 111 in that plane will be an ellipse, but b sin ξ will remain small. As p<r and p>b sinε

$$\xi \ll r \text{ so } 0 < \vartheta < \epsilon < \frac{\pi}{2}.$$

Clearly any means provided to make any such rays from a plasma arc more meridional must limit the value of ϑ, and thus ε, to be useful. This relationship also holds for a tangentially emitted ray not in the plane of the paper if ϑ is the projection of the angle of incidence of that ray at the point 40 on the plane of the paper and ε is the angle between the projection of that ray on the plane of the paper and the radius vector 71. Similarly if a convex mirror was substituted for the concave mirror 37.

6.2.2.1 Further Mirror.

FIG. 3 also shows a portion of a further mirror 112, in the form of a cylinder or a truncated cone, as in GB 2,305,516 B and U.S. Pat. No. 5,818,649. A ray 114 from the plasma arc 111 is incident to the further mirror 112 at the point 115 which lies at a distance q along a radius vector 116 from the axis of symmetry 18.

The ray 114 is reflected from the further mirror 112 at an angle whose projection on the plane 38 is φ as the ray 117 and is then incident to the concave mirror 37 at a point 118 along a radius vector 119 of length r measured from the axis of symmetry 18. The projection of the angle of incidence of the ray 117 on the plane 38 is ψ. By the Law of Sines:

$$\frac{r}{\sin(\pi - \phi)} = \frac{q}{\sin\psi}$$

or $$\sin\psi = \frac{q}{r}\sin\phi$$

As $$q < r \text{ so } 0 < \psi < \phi < \frac{\pi}{2}.$$

Similarly if a convex mirror was substituted for the concave mirror 37. The projection of the angle of incidence of the ray 114 on the plane 38 is Φ. If the normal to the surface of the further mirror 112 lies in the plane 38, or both the rays 114 and 117 as well as that normal lie in a plane rotated about an axis in the plane 38 at a right-angle to the radius vector 116, then φ=Φ. Otherwise φ is less than Φ. Hence φ≦Φ and $$0 < \psi < \phi < \frac{\pi}{2}.$$

Hence the further mirror 112 makes some of those rays from the plasma arc 111 which it reflects to a concave (or convex) mirror 37 more meridional.

6.3 Relationship of Leading Edges in a Typical Known Embodiment.

FIG. 28 of GB 2,305,516B is a schematic diagram showing a typical embodiment of an eye mirror with a source 3 in front of its input aperture.

Well directed rays incident to a point either on the first stage defined mirror 31 or the second stage defined mirror 33 lie within the circular cone defined by the angular input aperture at that point, as shown in FIG. 28 of GB 2,305,516 B, or just outside that cone. For a source 3 whose surface lies near the axis of symmetry 18, such rays lie in a meridional plane through that axis, or are close to such a plane, as described in Section 6.2.1.

Figure 2:
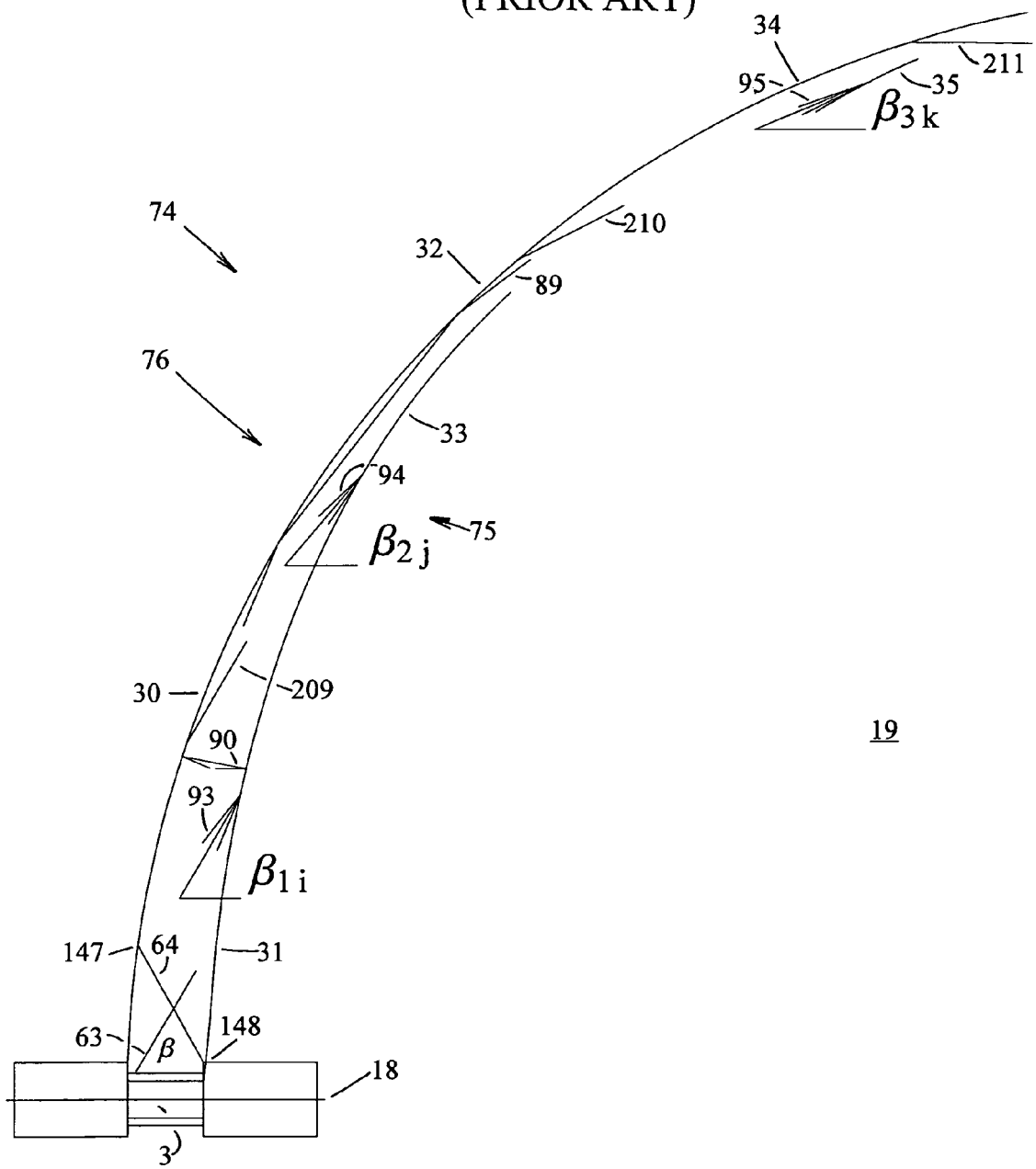

The direction of the output of the first stage defining ray 209 is away from the source 3, the direction of the output of the third and final stage defining ray 211 is towards the target 208, and the direction of the output of the second and intermediate stage defining ray 210 is intermediate between said directions, as shown in FIG. 28 of GB 2,305,516 B. For a source 3 whose surface lies near the axis of symmetry 18, that point of the defined mirror of the lowest numbered stage of said successive stages which is nearest the source 3 has the largest values of the output angles β₁ and β₂. The defined mirrors of each successive stage are further from the source 3 and from the axis of symmetry 18 and the values of the ouput angles β₁ and β₂ progressively reduce as the point of intersection of the defining rays moves along the continuous surface away from the source 3 through said successive stages. The relationship of the output angles was optional for the eye mirror in FIG. 28 of GB 2,305,516 B, the surface of whose source did not lie near the axis of symmetry 18. FIG. 2 hereof also includes the first, the second and the third stage defining rays 209, 210 and 211 respectively, with such a relationship of their output angles.

FIG. 2 hereof shows an embodiment described in GB 2,305,516B, with its source enclosed as illustrated in FIGS. 23 and 73 thereof, with certain additions which illustrate the arrangement when the surface of the source 3 lies near the axis of symmetry 18. FIG. 1 shows that embodiment with the changes and additions claimed in the present invention.

FIG. 2 includes a section of an embodiment of the apparatus of GB 2,305,516 B in a plane 19 through an axis of symmetry 18. An eye mirror 74 is axially symmetric about that axis of symmetry 18 and comprises first, second and third stage defining mirrors 30, 32 and 34 respectively and first, second and third stage defined mirrors 31, 33 and 35 respectively. The first, second and third stage defining mirrors 30, 32 and 34 respectively form a defining unit 76 in which an edge of the reflective surface of said first stage defining mirror 30 is everywhere contiguous with an edge of the reflective surface of said second stage defining mirror 32 and the other edge of the reflective surface of said second stage defining mirror 32 is everywhere contiguous with an edge of the reflective surface of said third stage defining mirror 34; so that said defining mirrors form a continuous reflective surface. The first and second stage defined mirrors 31 and 33 respectively similarly form a fixed defined unit 75 in which an edge of the reflective surface of said first stage defined mirror 31 is everywhere contiguous with an edge of the reflective surface of said second stage defined mirror 33; so that said defined mirrors form a continuous reflective surface.

FIG. 2 additionally shows the axis of a circular cone 93 defined by the angular input aperture of the ith point on the first stage defined mirror 31 with an angle to the axis of symmetry 18 of $\beta_{1i}$, the axis of a circular cone 94 defined by the angular input aperture of the jth point on the second stage defined mirror 33 with an angle to the axis of symmetry 18 of $\beta_{2j}$, and the axis of a circular cone 95 defined by the angular input aperture of the kth point on the third stage defined mirror 35 with an angle to the axis of symmetry 18 of $\beta_{3k}$. All these axes lie in the plane 19 of the paper.

In an embodiment where the surface of the source 3 lies near the axis of symmetry 18 and the values of the ouput angles progressively reduce as the point of intersection of the defining rays moves along the continuous surface away from the source 3 through said successive stages:

$$\frac{\pi}{2} \gg \beta_{1i} > \beta_{2j} > \beta_{3k} > 0 \ \forall\ i, j, k.$$

The leading edge 147 of the first stage defining mirror 30 only extends towards the axis of symmetry 18 so far as is necessary for the reflections of all such well directed rays from the first stage defined mirror 31 to be incident to it. In general, the ray incident to its leading edge 147 will be the reflection of the innermost defining ray 64 for the leading edge 148 of the first stage defined mirror 31.

It will be seen that the leading edge 147 of the first stage defining mirror 30 must lie further from the axis of symmetry 18 than the leading edge 148 of the first stage defined mirror 31 in a typical embodiment.

It will also be seen that the defining unit 76 has been extended downwards to meet the source 3, which itself has been slightly extended beyond the leading edge 147 of the first stage defining mirror 30. While this extension of the defining unit prevents rays escaping from the eye mirror 74, it also causes rays to be trapped and eventually be returned to that source.

FIG. 2 also shows two reflections of a ray 89 which is bouncing round the inside of the defining mirrors. FIG. 2 additionally shows two reflections of a ray 90 which is being turned back towards the axis of symmetry 18 by a pair of reflections at a defining and a defined mirror, or vice versa for the reverse of said ray.

6.4 Present Invention.

6.4.1 Single Source on Axis of Symmetry.

6.4.1.1 Further Defined Mirror.

Consider a ray 63 from an arbitrary point on the surface of the source 3 which lies in or close to the plane 19 of the paper in FIG. 2 and is at a variable angle $\beta$ to the axis of symmetry 18.

If the angle $\beta$ is small but somewhat greater than zero, the ray 63 will fall within the angular input aperture of a point on either the first or the second stage defined mirror 31 or 33 respectively. For higher values of $\beta$, the ray 63 will be incident to the inside of the defining unit 76. But if the value of $\beta$ is sufficiently high, the ray 63 will be emitted in a direction which would pass outside the first stage defining mirror 30 if the defining unit 76 had not been extended.

In the present invention, rays for such high values of $\beta$ are returned to the device by a further defined mirror 2 which lies outside the aperture described by the leading edge 147 of the first stage defining mirror 30. And the source 3 also extends outside that aperture.

FIG. 1 shows a section of the first embodiment of the apparatus of the present invention in a plane 19 through an axis of symmetry 18. An eye mirror 74 is axially symmetric about that axis of symmetry 18 and comprises first, second and third stage defining mirrors 30, 32 and 34 respectively and first, second and third stage defined mirrors 31, 33 and 35 respectively. The first, second and third stage defining mirrors 30, 32 and 34 respectively form a defining unit 76 in which an edge of the reflective surface of said first stage defining mirror 30 is everywhere contiguous with an edge of the reflective surface of said second stage defining mirror 32 and the other edge of the reflective surface of said second stage defining mirror 32 is everywhere contiguous with an edge of the reflective surface of said third stage defining mirror 34; so that said defining mirrors form a continuous reflective surface. The first and second stage defined mirrors 31 and 33 respectively similarly form a fixed defined unit 75 in which an edge of the reflective surface of said first stage defined mirror 31 is everywhere contiguous with an edge of the reflective surface of said second stage defined mirror 33; so that said defined mirrors form a continuous reflective surface. It will be appreciated that the eye mirror 74 may have further stages in parallel to any of said stages.

FIG. 1 also shows the leading edge 147 of the first stage defining mirror 30, the leading edge 148 of the first stage defined mirror 31 and the trailing edge 149 of the second stage defined mirror 33. The leading edge 147 is some way from the axis of symmetry 18, therebye decreasing the proportion of rays becoming trapped inside the device. The gap between the trailing edge 149 and the defining unit 76 is small, therebye reducing the proportion of rays bouncing round the inside of one or more of the defining mirrors.

FIG. 1 additionally shows a source 3 of electromagnetic energy of one or more wavelengths comprising a volume of plasma. Its length lies along the axis of symmetry 18, its surface lies near that axis, and it extends outside the aperture described by the leading edge 147 of the first stage defining mirror 30. It is preferably a water-wall arc lamp.

A pair of defining rays 5 and 6 respectively emanate from different points on or within said extended source 3 and meet at a point of intersection 7 on a further defined mirror 2. Each of said defining rays 5 and 6 is of a defining wavelength, $\lambda$.

Said first defining ray 5 is reflected from said further defined mirror 2 and intersects the fixed defined unit 75 at a respective further point 8 within the circular cone 91 defined by the angular input aperture at that point.

Said second defining ray 6 is reflected from said further defined mirror 2 and intersects the fixed defined unit 75 at a respective further point 10 within the circular cone 92 defined by the angular input aperture at that point. Both said defining rays 5 and 6 are incident to the same side of the fixed defined unit 75. The further defined mirror 2 is optically nearer to any point in the extended source 3 than the fixed defined unit 75 along both defining rays 5 and 6.

There are two such defining rays 5 and 6 for every point on the further defined mirror 2. The further defined mirror 2 lies outside the aperture described by the leading edge 147 of the first stage defining mirror 30 and is axially symmetric about the axis of symmetry 18.

6.4.1.2 Concave Off-axis Ellipsoidal Mirror.

Figure 4:
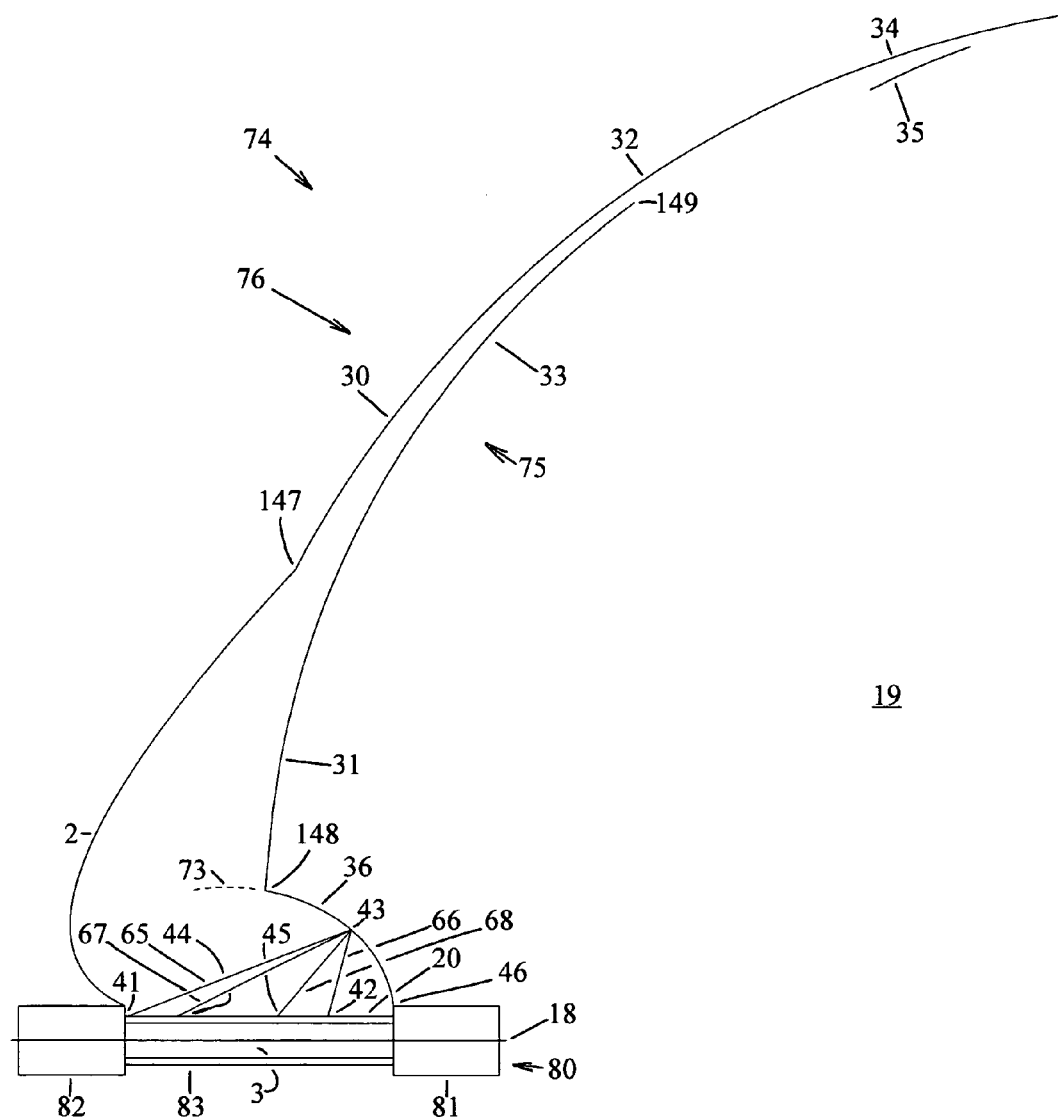
FIG. 4 is a schematic diagram of an embodiment of the present invention with a concave off-axis ellipsoidal mirror.

FIG. 4 shows a section of a further embodiment of the apparatus of the invention in a plane 19 through an axis of symmetry 18. An eye mirror 74 is axially symmetric about that axis of symmetry 18 and comprises first, second and third stage defining mirrors 30, 32 and 34 respectively and first, second and third stage defined mirrors 31, 33 and 35 respectively. The first, second and third stage defining mirrors 30, 32 and 34 respectively form a defining unit 76 in which an edge of the reflective surface of said first stage defining mirror 30 is everywhere contiguous with an edge of the reflective surface of said second stage defining mirror 32 and the other edge of the reflective surface of said second stage defining mirror 32 is everywhere contiguous with an edge of the reflective surface of said third stage defining mirror 34; so that said defining mirrors form a continuous reflective surface. The first and second stage defined mirrors 31 and 33 respectively similarly form a fixed defined unit 75 in which an edge of the reflective surface of said first stage defined mirror 31 is everywhere contiguous with an edge of the reflective surface of said second stage defined mirror 33; so that said defined mirrors form a continuous reflective surface. It will be appreciated that the eye mirror 74 may have further stages in parallel to any of said stages.

FIG. 4 also shows the leading edge 147 of the first stage defining mirror 30, the leading edge 148 of the first stage defined mirror 31 and the trailing edge 149 of the second stage defined mirror 33. The leading edge 148 of the first stage defined mirror 31 is some way from the axis of symmetry 18. The leading edge 147 of the first stage defining mirror 30 is even further away from the axis of symmetry 18, therebye further decreasing the proportion of rays becoming trapped inside the device. The gap between the trailing edge 149 and the defining unit 76 is even smaller, therebye further reducing the proportion of rays bouncing round the inside of one or more of the defining mirrors.

A water-wall arc lamp 80 is also axially symmetric about that axis of symmetry 18. The water-wall arc lamp 80 comprises a cathode assembly 81, an anode assembly 82 and a quartz tube 83. The water-wall arc lamp 80 provides a source 3 which both extends outside the aperture described by the leading edge 147 of the first stage defining mirror 30 and inside the aperture described by the leading edge 148 of the first stage defined mirror 31. The ratio of the diameter of the quartz tube 83 to that of the eye mirror 74 may be several times that shown in FIGS. 1 and 4: so that the surface of the source 3 may be relatively further from the axis of symmetry 18.

An edge of the quartz tube 83 in the plane 19 is a line 20 parallel to the axis of symmetry 18, which is also the axis of a half-ellipse 73 with a leading focus 41 and a trailing focus 42. The half-ellipse 73 passes through the leading edge 148 of the first stage defined mirror 31, as shown, or close to it. It also passes through the edge 46 of the cathode assembly 81, as shown, or close to it. A concave off-axis ellipsoidal mirror 36 is formed by the rotation of that portion of the half-ellipse 73 inside said aperture between the leading edge 148 and the edge 46 about the axis of symmetry 18.

For any point 43 of that portion of the half-ellipse, a ray 65 in the plane 19 through the axis of symmetry 18 from the leading focus 41 is either absorbed by the ellipsoidal mirror 36 or specularly reflected by it as the ray 66 through the trailing focus 42. Similarly, the reverse of the ray 66 from the trailing focus 42 is either absorbed by the ellipsoidal mirror 36 or specularly reflected by it as the reverse of the ray 65 through the leading focus 41.

A ray 67 in the plane 19 through the axis of symmetry 18 from a point 44 on the line 20 between the two foci 41 and 42 through the point 43 is either absorbed by the ellipsoidal mirror 36 or specularly reflected by it as the ray 68 to a point 45 on the line 20 between the two foci 41 and 42. So that any ray 67 is returned to the water-wall arc lamp 80 after only one reflection and thus minimal loss of energy.

FIG. 4 also shows a further defined mirror 2. As the leading edge 147 of the first stage defined mirror 30 is even further from the axis of symmetry 18, the further defined mirror 2 is larger than in FIG. 1, and the source 3 extends further outside the aperture described by that leading edge.

6.5 The Edge-Ray Principle for a Reverse Concentrator.

For any single mirror there may be meridional planes containing extreme rays, which either graze an input aperture in that mirror at a range of angles in such a meridional plane (up to the largest possible angle or otherwise) to an optical axis (of symmetry or otherwise), or which are emitted from a source inside said mirror at the largest angle in a meridional plane (whether tangentially or otherwise). If the single mirror is designed so that all these extreme rays emerge from it through an exit aperture after a single reflection at an angle $\epsilon$ in a meridional plane measured from the desired output direction, then a very high proportion of the rays which enter that single mirror will emerge from it after one or more reflections, for a "three-dimensional" mirror, at an angle to the desired output direction which is smaller than or equal to $\epsilon$; or, for a "two-dimensional" mirror, with a projection in a meridional plane whose angle in that meridional plane measured from the desired output direction is smaller than or equal to $\epsilon$.

A three-dimensional mirror must be axially symmetric to have meridional planes through its axis of symmetry.

For a two-dimensional mirror, a meridional plane may be any plane lying only in those two dimensions. As such a mirror will extend unaltered in a third dimension perpendicular to the meridional planes, one of these planes will be a plane of symmetry. Such a mirror may have a further plane of symmetry at a right angle to the meridional planes; in which case, the optical axis may be the intersection of the further plane of symmetry with any one of the meridional planes.

Figure 5:
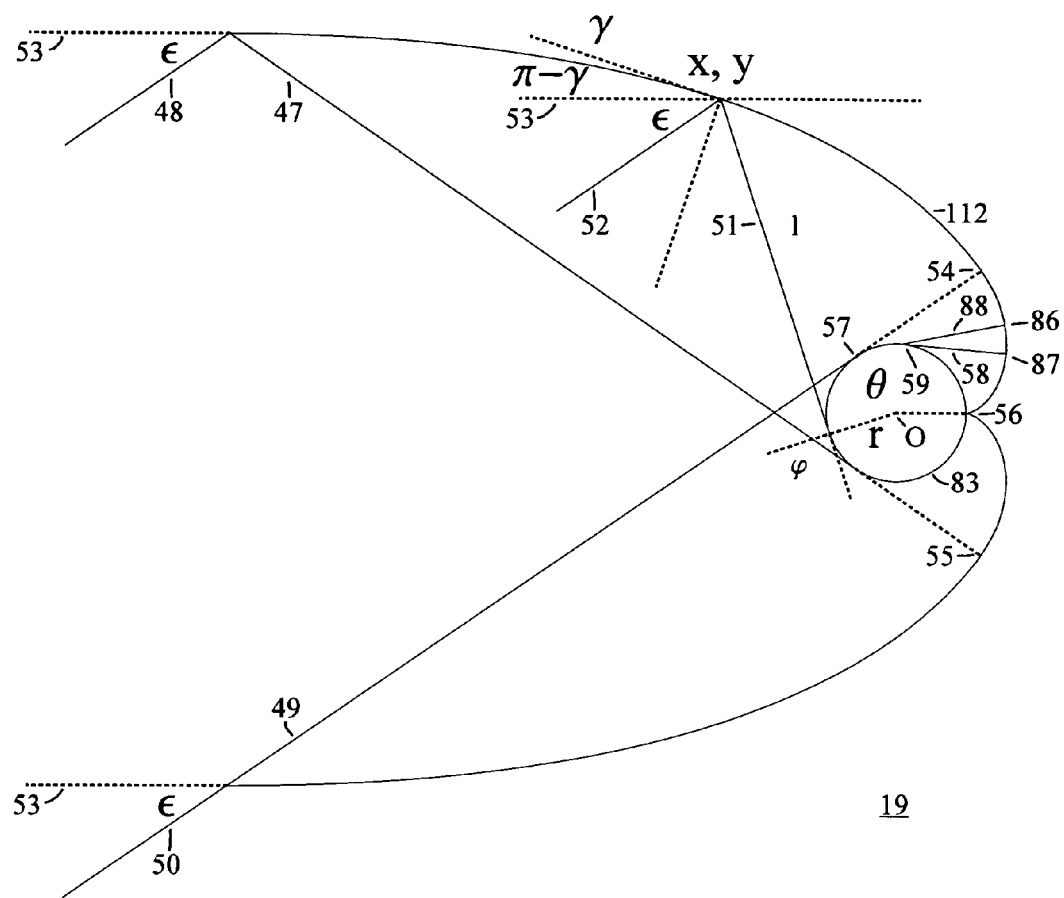
FIG. 5 is a schematic diagram illustrating the edge-ray principle for a reverse concentrator.

FIG. 5 shows an individual further mirror 112, which is two-dimensional, and an extreme ray 47, together with its reflection 48, an extreme ray 49, together with its continuation 50, and the desired output direction 53, all of which lie in a meridional plane 19 of the paper. Both of the rays 48 and 50 are at an angle $\epsilon$ to the desired output direction 53. It should be noted that if any extreme ray, such as 47, is the projection on the meridional plane 19 of a ray not in any meridional plane, then its reflection 48 will be the projection on the meridional plane 19 of the reflection of that non-meridional ray.

All the rays which enter a two-dimensional compound parabolic reverse concentrator, each of whose two ends are closed by a plane mirror in a meridional plane, will emerge with such a projected angle smaller than $\epsilon$. The angle $\epsilon$ must be chosen to limit the value of $\vartheta$, as described in Section 6.2.2.

Figure 6:
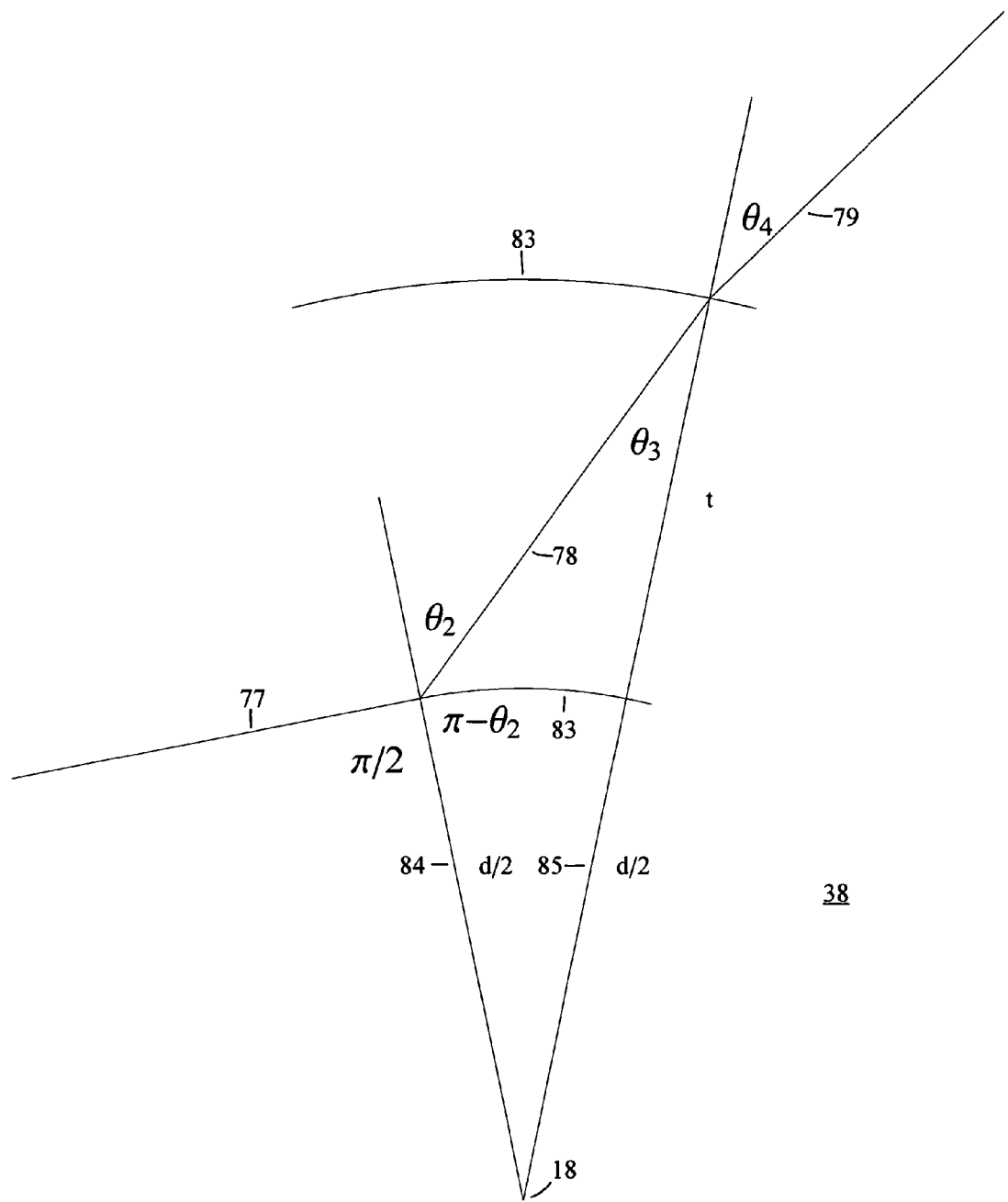
FIG. 6 shows a ray escaping from a quartz tube at the greatest possible angle in a plane at right angles to its axis of symmetry.

FIG. 6 shows a section of a quartz tube 83, which is axially symmetric about an axis of symmetry 18, in a plane 38 which is at right angles to that axis. A ray 77 in the plane 38 of the paper is incident to the inner wall of the quartz tube 83 where it is refracted as the ray 78, which is incident to the outer wall of the quartz tube 83 where it is refracted as the ray 79. A radius vector 84 is drawn in the plane 38 of the paper from the axis of symmetry 18 to the interception of the ray 77 with the inner wall of the quartz tube 83. A further radius vector 85 is drawn in the plane 38 of the paper from the axis of symmetry 18 to the interception of the ray 78 with the outer wall of the quartz tube 83.

If the angles of incidence and refraction at the inner wall of the quartz tube 83 are $$\frac{\pi}{2}$$

and $\theta_2$ respectively, while the angles of incidence and refraction at the outer wall of the quartz tube 83 are $\theta_3$ and $\theta_4$ respectively, as shown in FIG. 6, then by Snell's Law:

$$n_2 \sin\theta_2 = n_1 \sin\frac{\pi}{2} = n_1$$

and $$n_2 \sin\theta_3 = n_3 \sin\theta_4$$

where $n_1$ is the refractive index of the gas inside the quartz tube, $n_2$ is the refractive index of fused quartz, and $n_3$ is the refractive index of the air outside the quartz tube.

If the inner diameter of the quartz tube is d, and its thickness is t, as shown, then by the Law of Sines:

$$\frac{\frac{d}{2}+t}{\sin(\pi-\theta_2)} = \frac{\frac{d}{2}}{\sin\theta_3}$$

$$n_2\sin\theta_3 = \frac{d}{d+2t}n_2\sin\theta_2 = \frac{d}{d+2t}n_1$$

$$\frac{n_3}{n_1}\sin\theta_4 = \frac{d}{d+2t} < 1 \text{ as } t \gg 0$$

If the refractive indices of the gas inside the quartz tube and that of the air outside the quartz tube are both approximately equal to 1.003, no ray emitted from the quartz tube 83 in a plane at right angles to its axis will have an angle of refraction as high as $$\frac{\pi}{2}$$

or be tangent to its surface.

It is known that the inside surface of the water wall is very rough. But if a uniform film of water of thickness $t_w$ is present on the inside of the quartz tube, it can similarly be shown that:

$$\frac{n_3}{n_1}\sin\theta_4 = \frac{d}{d+2t+2t_\omega} < 1 \text{ as } t+t_\omega \gg 0$$

FIG. 5 shows an individual further mirror 112 and a quartz tube 83, both of which are two-dimensional, and an extreme ray 51 together with its reflection 52 and the desired output direction 53, all of which lie in a meridional plane 19 in the plane of the paper. The reflection 52 is at an angle $\epsilon$ in the meridional plane to the desired output direction 53. It should be noted that if the extreme ray 51 is the projection on the meridional plane 19 of a ray not in any meridional plane, then the reflection 52 will be the projection on the meridional plane 19 of the reflection of that non-meridional ray.

If the coordinates of a point on the surface of a quartz tube 83, which is convex but not necessarily circular, are r, θ while those at a point on the individual further mirror 112 are x, y and these points are seperated by a distance, l, along the extreme ray 51 as shown in FIG. 5, then:

$$x = r\cos\theta + l\cos(\theta+\phi-\pi) = r\cos\theta - l\cos(\theta+\phi)$$

$$y = r\sin\theta + l\sin(\theta+\phi-\pi) = r\sin\theta - l\sin(\theta+\phi)$$

where O is both the pole of the polar coordinate system and the origin of the Cartesian coordinate system, while $\phi$ is the angle from the radius vector r, θ to the reverse of the distance vector l, θ+φ−π which is not necessarily tangent to the surface of the quartz tube 83.

If γ is the gradient of the individual further mirror 112 at the point x, y while the maximum output angle is $\epsilon$, as shown, then equating the angles of incidence and reflection at that point on the individual further mirror 112 gives:

$$\frac{\pi}{2} - \epsilon - (\pi - \gamma) = \theta + \varphi - \pi - \left(\gamma - \frac{\pi}{2}\right) \text{ or}$$

$$2\gamma = \epsilon + \theta + \varphi$$

Now $\frac{dy}{dx} = \tan\gamma = \tan\frac{1}{2}(\epsilon+\theta+\varphi)$ so that:-

$$\frac{dr\sin\theta + r\cos\theta d\theta - dl\sin(\theta+\varphi) - l\cos(\theta+\varphi)(d\theta+d\varphi)}{dr\cos\theta - r\sin\theta d\theta - dl\cos(\theta+\varphi) + l\sin(\theta+\varphi)(d\theta+d\varphi)} -$$

$$\tan\frac{1}{2}(\epsilon+\theta+\varphi) = 0$$

$$dr\left(\sin\theta\cos\frac{1}{2}(\epsilon+\theta+\varphi) - \cos\theta\sin\frac{1}{2}(\epsilon+\theta+\varphi)\right) +$$

$$r\left(\cos\theta\cos\frac{1}{2}(\epsilon+\theta+\varphi) + \sin\theta\sin\frac{1}{2}(\epsilon+\theta+\varphi)\right)d\theta -$$

$$dl\left(\sin(\theta+\varphi)\cos\frac{1}{2}(\epsilon+\theta+\varphi) - \cos(\theta+\varphi)\sin\frac{1}{2}(\epsilon+\theta+\varphi)\right) -$$

$$l\left(\cos(\theta+\varphi)\cos\frac{1}{2}(\epsilon+\theta+\varphi) + \sin(\theta+\varphi)\sin\frac{1}{2}(\epsilon+\theta+\varphi)\right)$$

$$(d\theta+d\varphi) = 0$$

$$\sin\left(\theta - \frac{1}{2}(\epsilon+\theta+\varphi)\right)dr + r\cos\left(\theta - \frac{1}{2}(\epsilon+\theta+\varphi)\right)d\theta -$$

$$\sin\left(\theta+\varphi - \frac{1}{2}(\epsilon+\theta+\varphi)\right)dl -$$

$$l\cos\left(\theta+\varphi - \frac{1}{2}(\epsilon+\theta+\varphi)\right)2d\left(\theta+\varphi - \frac{1}{2}(\epsilon+\theta+\varphi)\right) = 0$$

$$\sin^2\left(\theta+\varphi - \frac{1}{2}(\epsilon+\theta+\varphi)\right)dl +$$

$$2l\sin\left(\theta+\varphi - \frac{1}{2}(\epsilon+\theta+\varphi)\right)\cos\left(\theta+\varphi - \frac{1}{2}(\epsilon+\theta+\varphi)\right)d\left(\theta+\varphi - \frac{1}{2}(\epsilon+\theta+\varphi)\right) =$$

$$\sin\left(\theta+\varphi - \frac{1}{2}(\epsilon+\theta+\varphi)\right)\sin\left(\theta - \frac{1}{2}(\epsilon+\theta+\varphi)\right)dr +$$

$$r\sin\left(\theta+\varphi - \frac{1}{2}(\epsilon+\theta+\varphi)\right)\cos\left(\theta - \frac{1}{2}(\epsilon+\theta+\varphi)\right)d\theta$$

$$d\left(l\sin^2\left(\theta+\varphi - \frac{1}{2}(\epsilon+\theta+\varphi)\right)\right) = \frac{1}{2}(\cos\varphi dr + r\sin\varphi d\theta - \cos(\theta-\epsilon)dr + r\sin$$

$$(\theta-\epsilon)d\theta)$$

If the distance vector is tangent to the surface of the quartz tube 83 then $$\sin\varphi = \frac{rd\theta}{ds} \text{ and } \cos\varphi = \frac{dr}{ds}$$

where s is the distance around the surface of the quartz tube in the plane 19 of the paper measured from the point 56. So that $\cos\phi dr + r\sin\phi d\theta = ((dr)^2 + (rd\theta)^2)/ds = ds$. Hence:

$$d\left(\frac{l}{2}\left(1-\cos 2\left(\theta+\varphi-\frac{1}{2}(\epsilon+\theta+\varphi)\right)\right)\right) = \frac{1}{2}(ds - d(r\cos(\theta-\epsilon)))$$

$l(1-\cos(\theta+\phi-\epsilon)) = s - r\cos(\theta-\epsilon) + C$ where C is a constant When $\theta=\theta_0$ by definition at the point 57, we have $r=r_0$, $s=s_0=l$ for reasons detailed below, and $\theta_0+\phi-\epsilon=\pi$ so that:

$C = s_0(1-\cos\pi) - s_0 + r_0\cos(\theta_0-\epsilon) = s_0 + r_0\cos(\theta_0-\epsilon)$ Hence:

$$l(1-\cos(\theta+\varphi-\epsilon)) = s + s_0 - r\cos(\theta-\epsilon) + r_0\cos(\theta_0-\epsilon)$$

provided $\frac{\pi}{2} + \epsilon \leq \theta \leq \frac{3\pi}{2} - \epsilon$.

When the surface of the quartz tube 83 is a circle $$\varphi = \frac{\pi}{2}, s = r\theta, \theta_0 = \frac{\pi}{2} + \epsilon \text{ and } s_0 = r\left(\frac{\pi}{2} + \epsilon\right);$$

so that:

$$l(1+\sin(\theta-\epsilon)) = r\left(\theta + \epsilon + \frac{\pi}{2} - \cos(\theta-\epsilon)\right)$$

And the individual further mirror 112 is symmetric about the plane y=0.

For the point 57:

$$\gamma = \frac{1}{2}(\epsilon + \theta_0 + \varphi)$$
$$= \frac{1}{2}(2\epsilon + \theta_0 + \varphi - \epsilon)$$
$$= \frac{1}{2}(2\epsilon + \pi)$$
$$= \epsilon + \frac{\pi}{2}$$

The ray 51 becomes normal to the further mirror 112 and the reverse of the ray 49. So that no such ray incident at the point 54 can leave through the exit aperture after a single reflection. Similarly for the point 55. For points on the individual further mirror 112 between the points 54 and 55 respectively, the gradient of the individual further mirror 112 must be chosen so that no reflected ray is turned back towards the source.

It will be seen from FIG. 5 that this will not happen if the portion of the further mirror between the point 54 and the point 56 is respectively the involute of the portion of the surface of the quartz tube 83 between the point 57 and the point 56. For the ray 58 emitted from a point 59 on the surface of the quartz tube 83 tangentially at an angle of $$\frac{\pi}{2}$$

to the normal at that point on the source will then be the normal to the individual further mirror 112 at its point of intersection 87. And any ray 88 emitted at a lower angle to the normal at the point 59 will intersect the involute at a point 86 between the point 87 and the point 54 at which a further tangentially emitted ray from a point on the surface of the quartz tube 83 nearer the point 57 is normal to that involute, and will not therefore be reflected back towards the source. Similarly for that portion of the individual further mirror 112 between the point 55 and the point 56.

For the portion of the individual further mirror 112 between the point 54 and the point 55 where $$-\frac{\pi}{2} - \epsilon \leq \theta \leq \frac{\pi}{2} + \epsilon$$

we may use the involute; for which:

$(dl)^2 = (dr)^2 + (rd\theta)^2 = (ds)^2$ so that $l = s + C$ where C is a constant When $\theta=0$ we have $l=s=0$ so that $C=0$ giving:

$l=s$

When the surface of the quartz tube 83 is a circle:

$l=s=r\theta$

It should be mentioned that a reverse concentrator may be truncated before its exit aperture, without excessive loss of utility, if its length is excessive in relation to the radius of the eye mirror.

6.6 Present Invention.

6.6.1 Circular Array of Plasma Arcs.

6.6.1.1 Further Defined Mirror.

Figure 7:
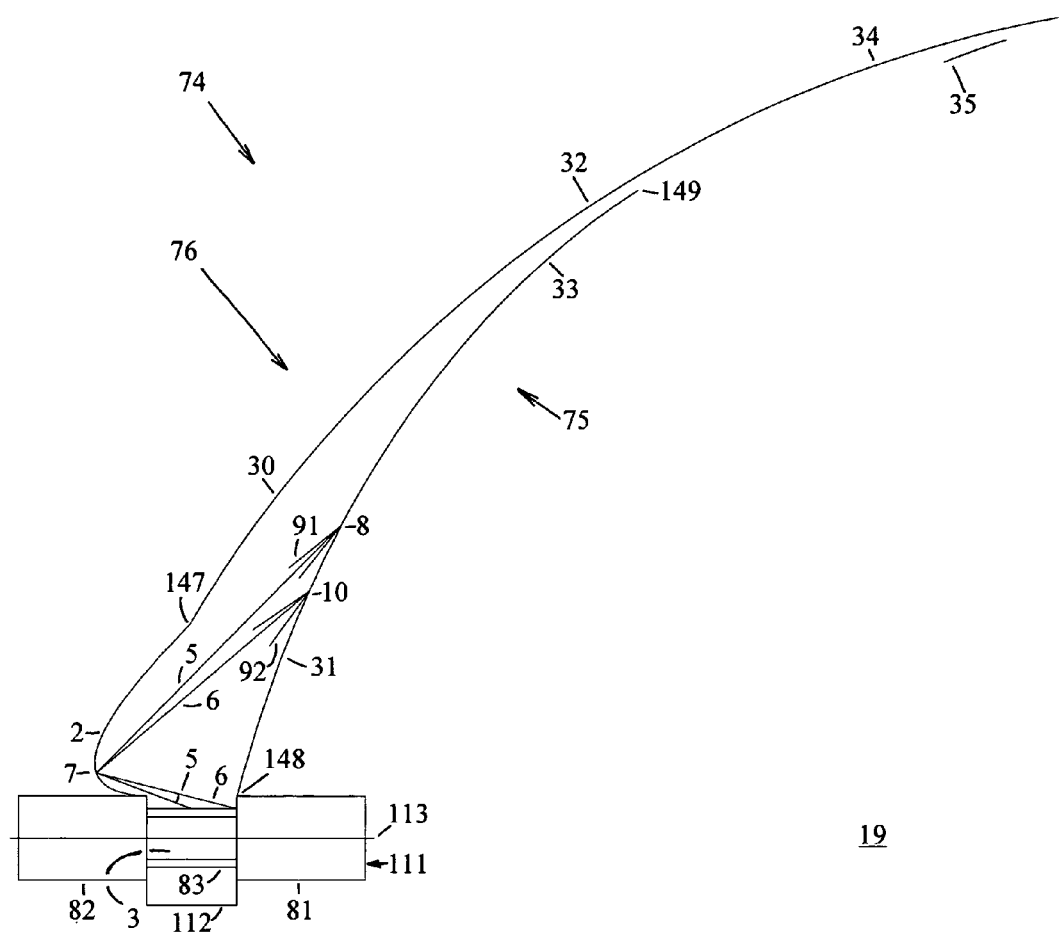
FIG. 7 is a schematic diagram in a section through the axis of symmetry of the eye mirror applicable to two embodiments of the present invention, each with a circular array of plasma arcs, and one or more further defined mirrors respectively.

FIG. 7 shows a section of a further embodiment of the apparatus of the present invention in a plane 19 through an axis of symmetry 18. An eye mirror 74 is axially symmetric about that axis of symmetry 18 and comprises first, second and third stage defining mirrors 30, 32 and 34 respectively and first, second and third stage defined mirrors 31, 33 and 35 respectively. The first, second and third stage defining mirrors 30, 32 and 34 respectively form a defining unit 76 in which an edge of the reflective surface of said first stage defining mirror 30 is everywhere contiguous with an edge of the reflective surface of said second stage defining mirror 32 and the other edge of the reflective surface of said second stage defining mirror 32 is everywhere contiguous with an edge of the reflective surface of said third stage defining mirror 34; so that said defining mirrors form a continuous reflective surface. The first and second stage defined mirrors 31 and 33 respectively similarly form a fixed defined unit 75 in which an edge of the reflective surface of said first stage defined mirror 31 is everywhere contiguous with an edge of the reflective surface of said second stage defined mirror 33; so that said defined mirrors form a continuous reflective surface. It will be appreciated that the eye mirror may have further stages in parallel to any of said stages.

FIG. 7 also shows the leading edge 147 of the first stage defining mirror 30, the leading edge 148 of the first stage defined mirror 31 and the trailing edge 149 of the second stage defined mirror 33. The leading edge 148 of the first stage defined mirror 31 is some way from the axis of symmetry 18. The leading edge 147 of the first stage defining mirror 30 is even further away from the axis of symmetry 18, therebye further decreasing the proportion of rays becoming trapped inside the device. The gap between the trailing edge 149 and the defining unit 76 is even smaller, therebye further reducing the proportion of rays bouncing round the inside of one or more of the defining mirrors.

This embodiment comprises a circular array of plasma arcs 111 arranged on the surface of a cylinder or cone, whose axis is the axis of symmetry 18. Each plasma arc 111 is axially symmetric about a respective axis 113 lying in the surface of that cylinder or cone and in a plane through the axis of symmetry 18. In FIG. 7, such an axis 113 lies in the plane 19 of the paper. Each plasma arc 111 is preferably a water-wall arc lamp, which is then the water-wall arc lamp 111 axially symmetric about the axis 113. The water-wall arc lamp 111 comprises a cathode assembly 81, an anode assembly 82 and a quartz tube 83. The water-wall arc lamp 111 provides a source 3 which extends outside the aperture described by the leading edge 147 of the first stage defining mirror 30. An individual further mirror 112 is provided to reflect that electromagnetic energy, which is emitted from the quartz tube 83 in a direction other than meridionally outwards, or approximately meridionally outwards, towards such a direction. This individual further mirror may be in the form of a portion of a cylinder axially symmetric about the respective axis 113, a portion of a truncated cone axially symmetric about the respective axis 113, a parabolic cylinder whose foci lie on the respective axis 113, but is preferably a reverse concentrator. It may be electrically grounded to provide a ground plane which aids arc breakdown within the quartz tube 83. Any gap at one of its ends between it and either an electrode, or one of the other mirrors, may conveniently be filled by a plane mirror, to prevent electromagnetic energy escaping from the apparatus.

A pair of defining rays 5 and 6 respectively emanate from different points on or within said extended source 3 and meet at a point of intersection 7 on a further defined mirror 2. Each of said defining rays 5 and 6 is of a defining wavelength, λ.

Said first defining ray 5 is reflected from said further defined mirror 2 and intersects the fixed defined unit 75 at a respective further point 8 within the cone 91 defined by the angular input aperture at that point.

Said second defining ray 6 is reflected from said further defined mirror 2 and intersects the fixed defined unit 75 at a respective further point 10 within the cone 92 defined by the angular input aperture at that point. Both said defining rays 5 and 6 are incident to the same side of the fixed defined unit 75. The further defined mirror 2 is optically nearer to any point in the extended source 3 than the fixed defined unit 75 along both defining rays 5 and 6.

There are two such defining rays 5 and 6 for every point on the further defined mirror 2. The further defined mirror 2 lies outside the aperture described by the leading edge 147 of the first stage defining mirror 30 and is symmetric about the axis of symmetry 18. It will be appreciated that an individual further defined mirror could be provided for each plasma arc 111 and be axially symmetric about its respective axis 113. But that as such a mirror is only required to reflect rays having a meridionally outwards direction, it need not extend all the way round that axis.

6.6.1.2 Concave Off-axis Ellipsoidal Mirror.

Figure 8:
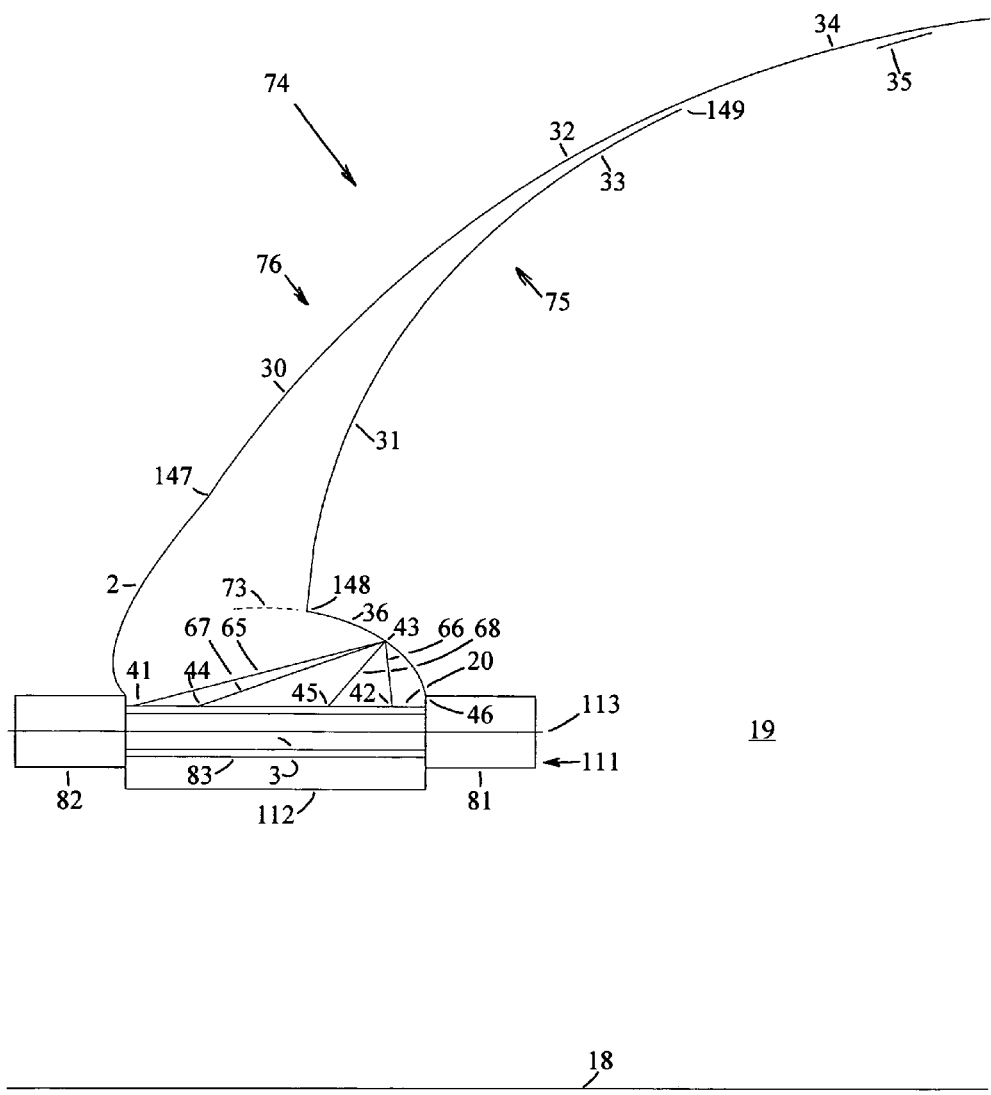
FIG. 8 is a schematic diagram in a section through the axis of symmetry of the eye mirror applicable to various embodiments of the present invention, each with a circular array of plasma arcs, and either one or more concave off-axis ellipsoidal mirrors.

FIG. 8 shows a section of a further embodiment of the apparatus of the present invention, which includes all the components shown in FIG. 7, in a plane 19 through an axis of symmetry 18. But the leading edge 147 of the first stage defining mirror 30 is a considerable distance from the axis of symmetry 18, therebye even further decreasing the proportion of rays being trapped inside the device. The gap between the trailing edge 149 of the second stage defined mirror 33 and the defining unit 76 is much smaller, therebye even further reducing the proportion of rays bouncing round the inside of one or more of the defining mirrors. And the water-wall arc lamp 111 provides a source 3 which both extends outside the aperture described by the leading edge 147 of the first stage defining mirror 30 and inside the aperture described by the leading edge 148 of the first stage defined mirror 31. An extended individual further mirror 112 is provided to reflect that electromagnetic energy, which is emitted from the quartz tube 83 in a direction other than meridionally outwards, or approximately meridionally outwards, towards such a direction. This individual further mirror may again be in the form of a portion of a cylinder axially symmetric about the respective axis 113, a portion of a truncated cone axially symmetric about the respective axis 113, a parabolic cylinder whose foci lie on the respective axis 113, but is preferably a reverse concentrator.

An edge of the quartz tube 83 in the plane 19 is a line 20 parallel to the respective axis 113, which is also the axis of a half-ellipse 73 with a leading focus 41 and a trailing focus 42. The half-ellipse 73 passes through the leading edge 148 of the first stage defined mirror 31, as shown, or close to it. It also passes through the edge 46 of the cathode assembly 81, as shown, or close to it. A concave off-axis ellipsoidal mirror 36 is formed by the rotation of that portion of the half-ellipse 73 inside said aperture between the leading edge 148 and the edge 46 about the axis of symmetry 18. It will be appreciated that an individual concave off-axis ellipsoidal mirror could be provided for each plasma arc 111 and be axially symmetric about its respective axis 113. Such a mirror may replace that portion of the individual further mirror 112 which extends inside the aperture formed by the leading edge 148 of the first stage defined mirror 31. Any gaps which result may conveniently be filled by one or more plane mirrors, to prevent electromagnetic energy escaping from the apparatus.

For any point 43 of that portion of the half-ellipse, a ray 65 in the plane 19 through the axis of symmetry 18 from the leading focus 41 is either absorbed by the ellipsoidal mirror 36 or specularly reflected by it as the ray 66 through the trailing focus 42. Similarly, the reverse of the ray 66 from the trailing focus 42 is either absorbed by the ellipsoidal mirror 36 or specularly reflected by it as the reverse of the ray 65 through the leading focus 41.

A ray 67 in the plane 19 through the axis of symmetry 18 from a point 44 on the line 20 between the two foci 41 and 42 through the point 43 is either absorbed by the ellipsoidal mirror 36 or specularly reflected by it as the ray 68 to a point 45 on the line 20 between the two foci 41 and 42. So that any ray 67 in a plane through the axis of symmetry 18, or close to that plane, is returned to the water-wall arc lamp 80 after only one reflection and thus minimal loss of energy.

FIG. 8 also shows the further defined mirror 2. As the leading edge 147 of the first stage defined mirror 30 is a considerable distance from the axis of symmetry 18, the further defined mirror 2 is larger than in FIG. 7, and the source 3 extends further outside the aperture described by that leading edge.

6.6.1.3 Multiple Concave Off-axis Ellipsoidal Mirrors.

Figure 9:
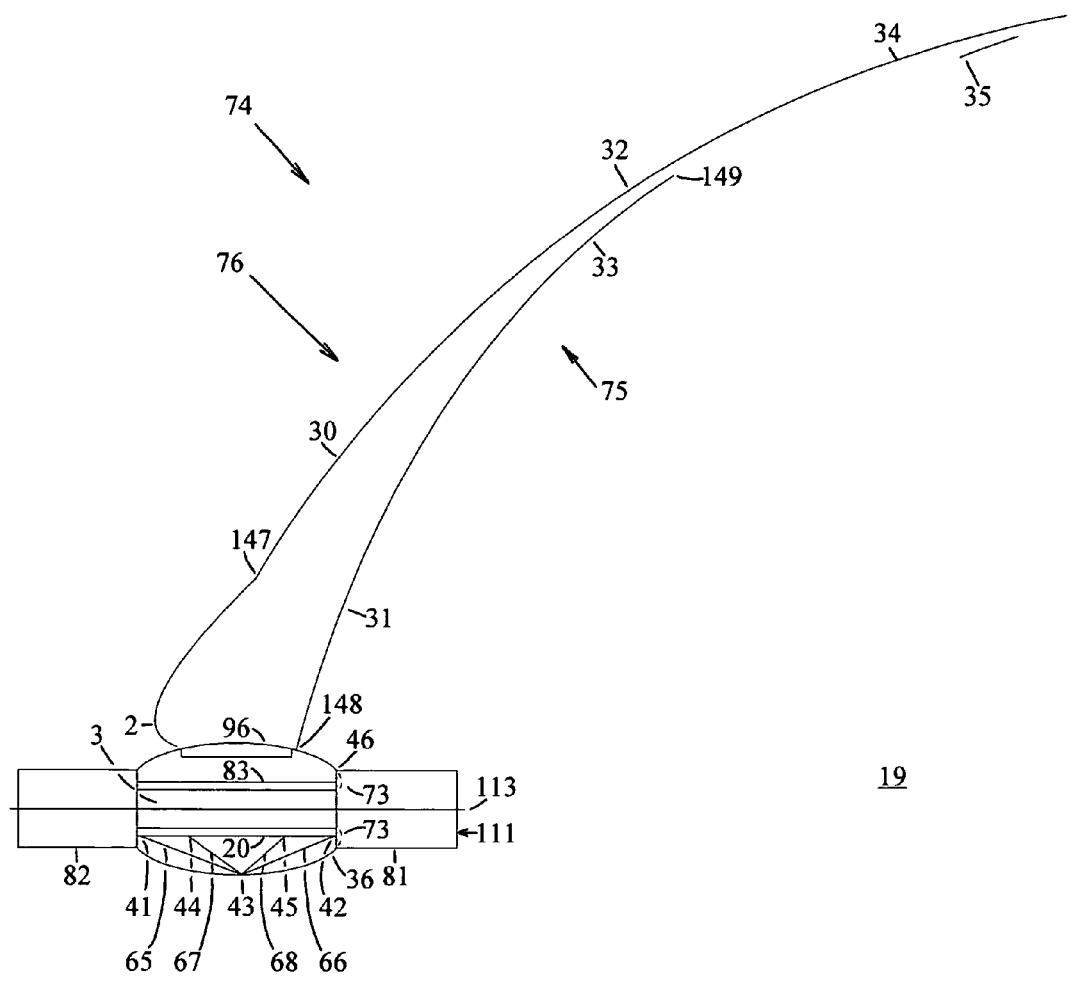
FIG. 9 is a schematic diagram in a section through the axis of symmetry of the eye mirror of an embodiment of the present invention with a circular array of plasma arcs each enclosed in a concave off-axis ellipsoidal mirror.

FIG. 9 shows a section of a further embodiment of the apparatus of the present invention in a plane 19 through an axis of symmetry 18. An eye mirror 74 is axially symmetric about that axis of symmetry 18 and comprises first, second and third stage defining mirrors 30, 32 and 34 respectively and first, second and third stage defined mirrors 31, 33 and 35 respectively. The first, second and third stage defining mirrors 30, 32 and 34 respectively form a defining unit 76 in which an edge of the reflective surface of said first stage defining mirror 30 is everywhere contiguous with an edge of the reflective surface of said second stage defining mirror 32 and the other edge of the reflective surface of said second stage defining mirror 32 is everywhere contiguous with an edge of the reflective surface of said third stage defining mirror 34; so that said defining mirrors form a continuous reflective surface. The first and second stage defined mirrors 31 and 33 respectively similarly form a fixed defined unit 75 in which an edge of the reflective surface of said first stage defined mirror 31 is everywhere contiguous with an edge of the reflective surface of said second stage defined mirror 33; so that said defined mirrors form a continuous reflective surface. It will be appreciated that the eye mirror may have further stages in parallel to any of said stages.

FIG. 9 also shows the leading edge 147 of the first stage defining mirror 30, the leading edge 148 of the first stage defined mirror 31 and the trailing edge 149 of the second stage defined mirror 33. The leading edge 148 of the first stage defined mirror 31 is some way from the axis of symmetry 18. The leading edge 147 of the first stage defining mirror 30 is even further away from the axis of symmetry 18, therebye further decreasing the proportion of rays becoming trapped inside the device. The gap between the trailing edge 149 and the defining unit 76 is even smaller, therebye further reducing the proportion of rays bouncing round the inside of one or more of the defining mirrors.

This embodiment comprises a circular array of plasma arcs 111 arranged on the surface of a cylinder or cone, whose axis is the axis of symmetry 18. Each plasma arc 111 is axially symmetric about a respective axis 113 lying in the surface of that cylinder or cone and in a plane through the axis of symmetry 18. In FIG. 9, such an axis 113 lies in the plane 19 of the paper. Each plasma arc 111 is preferably a water-wall arc lamp, which is then the water-wall arc lamp 111 axially symmetric about the axis 113. The water-wall arc lamp 111 comprises a cathode assembly 81, an anode assembly 82 and a quartz tube 83.

The water-wall arc lamp 111 provides a source 3 which both extends outside the aperture described by the leading edge 147 of the first stage defining mirror 30 and inside the aperture described by the leading edge 148 of the first stage defined mirror 31. An edge of the quartz tube 83 in the plane 19 is a line 20, which is also the axis of a half-ellipse 73 with a leading focus 41 and a trailing focus 42. The mirror image of the half-ellipse 73 passes through the leading edge 148 of the first stage defined mirror 31, as shown, or close to it. It also passes through the edge 46 of the cathode assembly 81, as shown, or close to it. A concave off-axis ellipsoidal mirror 36 is formed by the rotation of that half-ellipse 73 about the axis 113.

For any point 43 of the half-ellipse, a ray 65 in the plane 19 from the leading focus 41 is either absorbed by the ellipsoidal mirror 36 or specularly reflected by it as the ray 66 through the trailing focus 42. Similarly the reverse of the ray 66 from the trailing focus 42 is either absorbed by the ellipsoidal mirror 36 or specularly reflected by it as the reverse of the ray 65 through the leading focus 41.

A ray 67 in the plane 19 from a point 44 on the line 20 between the two foci 41 and 42 through the point 43 is either absorbed by the ellipsoidal mirror 36 or specularly reflected by it as the ray 68 to a point 45 on the line 20 between the two foci 41 and 42. So that any ray 67 is returned to the water-wall arc lamp 111 after only one reflection and thus minimal loss of energy.

A slot 96 in the ellipsoidal mirror 36 is symmetric about the plane 19 of the paper, which passes through both the axis 113 and the axis of symmetry 18. Its width perpendicular to the paper is greater than the diameter of the quartz tube 83.

Figure 10:
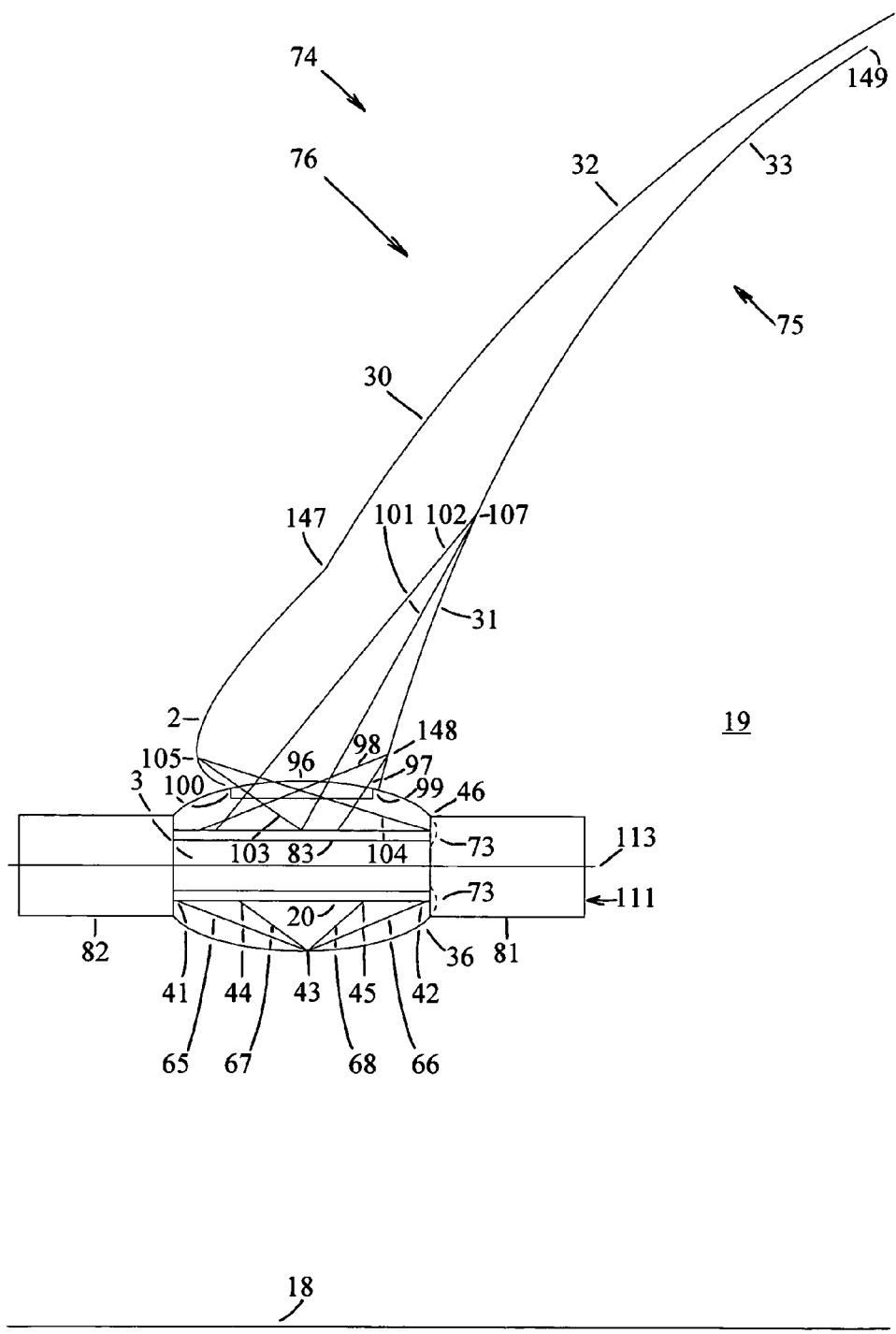
FIG. 10 is an enlarged view of part of FIG. 9 from which the third stage defining and defined mirrors have been omitted.

FIG. 10 is an enlarged view of part of FIG. 9 from which the third stage defining and defined mirrors have been omitted. Rays 97 and 98 respectively, lying in the plane 19 of the paper, are the two defining rays for the leading edge 148 of the first stage defined mirror 31. Rays 101 and 102 respectively, lying in the plane 19 of the paper, are the defining rays for a point 107 on the defined unit 75. The defining ray 97 passes close to the trailing edge 99 of the slot. All the defining rays for all the points on the fixed defined unit 75 intermediate between the leading edge 148 and the point 107 pass through the slot 96.

Rays 103 and 104 respectively, lying in the plane 19 of the paper, are the two defining rays for the leading edge 105 of the further defined mirror 2. The ray 103 passes close to the leading edge 100 of the slot (which may be the edge of the anode assembly 82). There are two such defining rays 103 and 104 for every point on the further defined mirror 2. The further defined mirror 2 lies outside the aperture described by the leading edge 147 of the first stage defining mirror 30 and is axially symmetric about the axis of symmetry 18. As the rays which can escape through the slot are meridional, or nearly so, there is no point in providing individual further defined mirrors axially symmetric about the axis of each plasma arc.

Hence all the rays which pass through the slot are not only in a plane through the axis of symmetry 18, or nearly so, but are also incident either to a defining mirror, or to a point either on the further defined mirror or on the fixed defined unit 75, within the cone described by the angular input aperture at the point, or just outside that cone.

6.6.1.4 Staggered Circular Arrays of Plasma Arcs.

Figure 11:
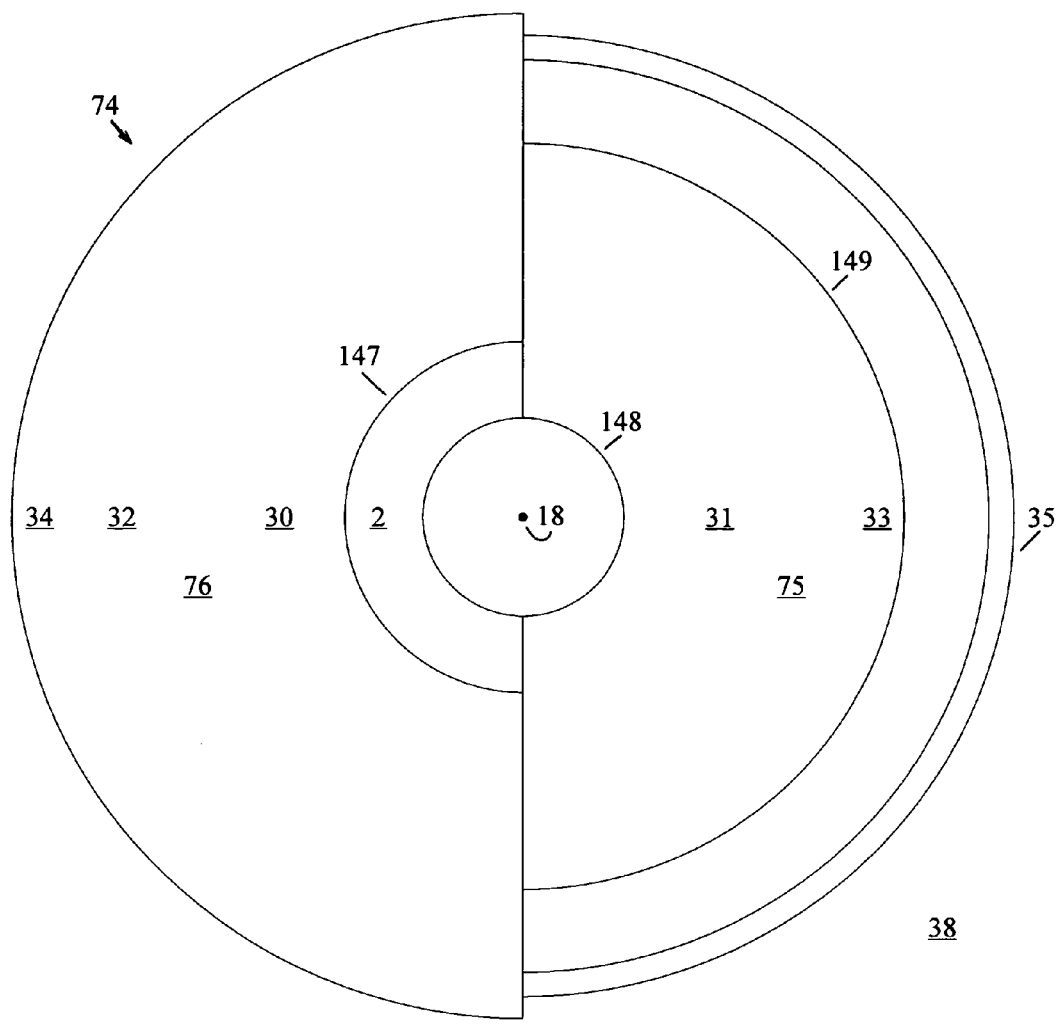
FIG. 11 is a schematic diagram with a left and a right view of a further embodiment of the present invention back-projected on a plane at right angles to the axis of symmetry of the eye mirror, excluding certain parts for clarity.

FIG. 11 shows a left and a right view of a further embodiment of the apparatus of the present invention back-projected on a plane 38 at right angles to an axis of symmetry 18. An eye mirror 74 is axially symmetric about that axis of symmetry 18 and comprises first, second and third stage defining mirrors 30, 32 and 34 respectively, shown in said left view, and first, second and third stage defined mirrors 31, 33 and 35 respectively, shown in said right view. The first, second and third stage defining mirrors 30, 32 and 34 respectively form a defining unit 76 in which an edge of the reflective surface of said first stage defining mirror 30 is everywhere contiguous with an edge of the reflective surface of said second stage defining mirror 32 and the other edge of the reflective surface of said second stage defining mirror 32 is everywhere contiguous with an edge of the reflective surface of said third stage defining mirror 34; so that said defining mirrors form a continuous reflective surface. The first and second stage defined mirrors 31 and 33 respectively similarly form a fixed defined unit 75 in which an edge of the reflective surface of said first stage defined mirror 31 is everywhere contiguous with an edge of the reflective surface of said second stage defined mirror 33; so that said defined mirrors form a continuous reflective surface. It will be appreciated that the eye mirror may have further stages in parallel to any of said stages.

The leading edge 148 of the first stage defined mirror 31 is some way from the axis of symmetry 18. The leading edge 147 of the first stage defining mirror 30 is even further away from the axis of symmetry 18, therebye further decreasing the proportion of rays becoming trapped inside the device. The gap, not shown, between the trailing edge 149 and the defining unit 76 is even smaller, therebye further reducing the proportion of rays bouncing round the inside of one or more of the defining mirrors. A further defined mirror 2, axially symmetric about the axis of symmetry 18, is shown in said left view.

Figure 12:
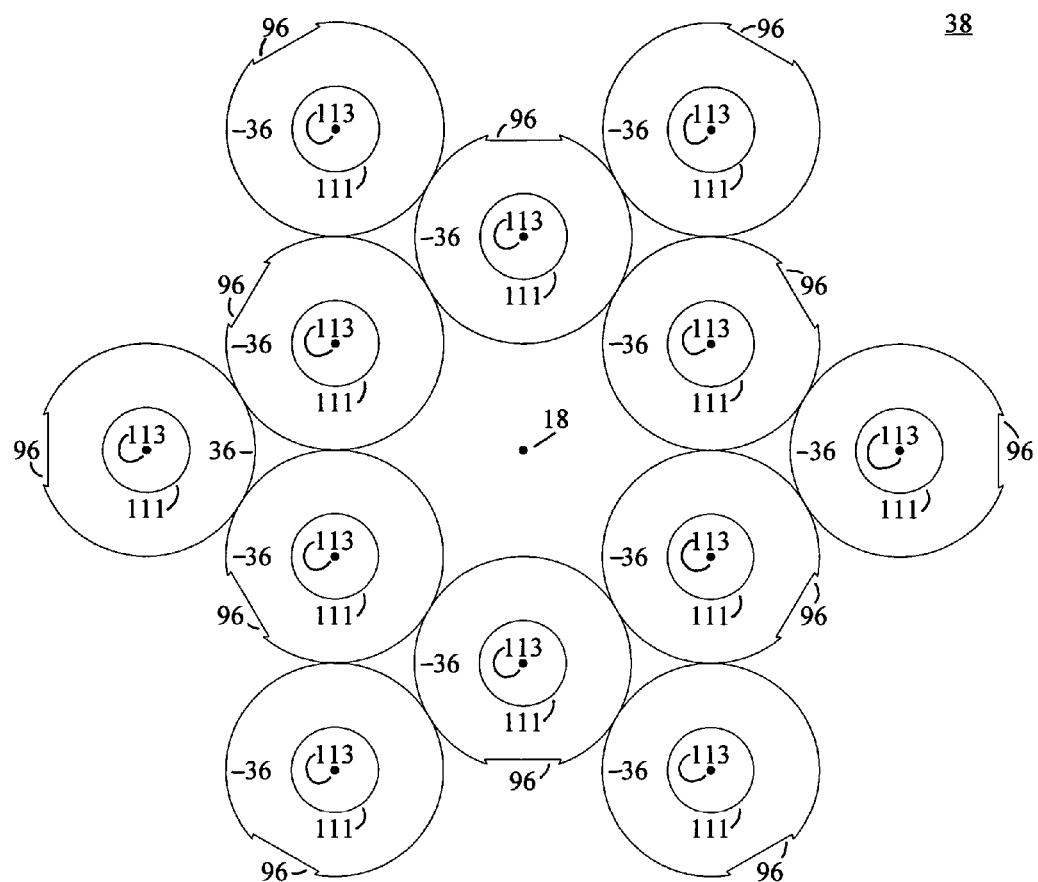
FIG. 12 is a schematic diagram back-projected on a plane at right angles to the axis of symmetry of the eye mirror of those parts of an embodiment of the present invention excluded from FIG. 11, namely, two staggered circular arrays of plasma arcs.

FIG. 12 shows an enlarged section of two circular arrays of plasma arcs 111 back-projected on the plane 38. The projection of the slots 96 of the inner circular array on the plane 38 would be tangent, or approximately so, to the projection of the leading edge 148 of the first stage defined mirror 31 on that plane, if FIGS. 11 and 12 were to the same scale.

The two circular arrays of plasma arcs 111 are arranged on the surfaces of respective cylinders (as shown) or cones, whose axes are the axis of symmetry 18: so that there is an inner and an outer circular array. Each plasma arc 111 is axially symmetric about a respective axis 113 lying in the surface of one of those cylinders or cones and in a plane through the axis of symmetry 18, and is enclosed within an off-axis ellipsoidal mirror 36 with a slot 96 symmetric about a plane through that respective axis and the axis of symmetry 18. The mirrors for the outer circular array are spaced so that electromagnetic energy from the inner circular array of plasma arcs may pass between them.

If there is only a single further defined mirror 2, it is preferably defined by defining rays from the inner circular array of plasma arcs, in the same manner as for the embodiment shown in FIG. 10. But, clearly, individual further defined mirrors, axially symmetric about the axis of symmetry 18 but over a limited angle, may be provided for each plasma arc so as to take account of the different distances from that axis of the arcs in the inner and outer circular arrays.

It will be appreciated that the length of the arcs, the size of the ellipsoidal mirrors, and the length of their slots for the outer circular array of plasma arcs are not necessarily the same as for the inner circular array of plasma arcs, and may be greater. Indeed, the diameter of the outer arcs themselves, and that of their electrodes, may also be greater. And the axial positions of both the leading and trailing edges of their respective components may differ between the inner and outer circular arrays.

I claim:

1. An apparatus for directing electromagnetic energy comprising an eye mirror with at least one first stage, with both at least one defining mirror and at least one defined mirror, each of which are axially symmetric about the common axis of symmetry of that eye mirror, and at least one source extending over an area or volume in which that source extends outside the aperture described by the leading edge of the, or the outermost, first stage defining mirror and a further defined mirror lies outside that aperture, a pair of defining rays respectively emanating from different points on or within said extended source and meeting at a point of intersection on that further defined mirror, each of said defining rays being of a defining wavelength, λ, said first defining ray being reflected from said further defined mirror and intersecting one of the defined mirrors of the eye mirror at a respective further point within the cone defined by the angular input aperture at that point, and said second defining ray being reflected from said further defined mirror and intersecting one of the defined mirrors of the eye mirror at a respective further point within the cone defined by the angular input aperture at that point, there being a total of two such defining rays for every point on the further defined mirror.

2. An apparatus as claimed in claim 1 in which there is only one area or volume source whose length lies along the axis of symmetry of the eye mirror, the further defined mirror is axially symmetric about that axis, and each pair of defining rays whose intersection specifies a point on that further defined mirror lie entirely in a respective plane through that axis of symmetry.

3. An apparatus as claimed in claim 2 in which the area or volume source extends inside the aperture described by the leading edge of the, or the innermost, first stage defined mirror and a concave off-axis ellipsoidal mirror is formed by the rotation about the axis of symmetry of the eye mirror of a portion of an ellipse which is inside said aperture and whose major axis lies at a distance from the axis of symmetry of the eye mirror but substantially parallel to that axis.

4. An apparatus as claimed in claim 2 in which the area or volume source is a water-wall arc lamp.

5. An apparatus as claimed in claim 3 in which the area or volume source is a water-wall arc lamp with a transparent tube and said major axis lies along the surface of the outer wall of that tube.

6. An apparatus as claimed in claim 1 in which there are multiple sources arranged as a circular array on the surface of a cylinder or cone axially symmetric about the axis of symmetry of the eye mirror, each of which sources extends outside the aperture described by the leading edge of the, or the outermost, first stage defining mirror, the further defined mirror is axially symmetric about the axis of symmetry of the eye mirror, and each pair of defining rays whose intersection specifies a point on that further defined mirror lie entirely in a respective plane through that axis of symmetry.

7. An apparatus as claimed in claim 6 in which each area or volume source extends inside the aperture described by the leading edge of the, or the innermost, first stage defined mirror, and is axially symmetric about its own axis of symmetry, and a concave off-axis ellipsoidal mirror is formed by the rotation about the axis of symmetry of the eye mirror of a portion of an ellipse which is inside said aperture and whose major axis lies further from the axis of symmetry of the eye mirror than the sources but substantially parallel to any one of their axes.

8. An apparatus as claimed in claim 6 in which each area or volume source is a water-wall arc lamp.

9. An apparatus as claimed in claim 7 in which each area or volume source is a water-wall arc lamp with a transparent tube and said major axis lies along the surface of the outer wall of any such tube.

10. An apparatus as claimed in claim 1 in which the further defined mirror is axially symmetric about the axis of symmetry of the eye mirror, each pair of defining rays whose intersection specifies a point on that further defined mirror lie entirely in a respective plane through that axis of symmetry, and there are multiple sources arranged as a circular array on the surface of a cylinder or cone axially symmetric about that axis, each of which sources both extends outside the aperture described by the leading edge of the, or the outermost, first stage defining mirror and inside the aperture described by the leading edge of the, or the innermost, first stage defined mirror, and is axially symmetric about its own axis of symmetry, and an individual concave off-axis ellipsoidal mirror is provided for each such source and formed by the rotation about that axis of an ellipse whose major axis is at a distance from that axis but substantially parallel to that axis, wherein there is a slot symmetric about a plane through both said axis and the axis of symmetry of the eye mirror.

11. An apparatus as claimed in claim 10 in which all the rays which pass through any of the slots are incident either to a defining mirror, or to a point either on the further defined mirror or on the, or one of a, first or second stage defined mirror, within the cone described by the angular input aperture at that point, or just outside that cone.

12. An apparatus as claimed in claim 10 in which each area or volume source is a water-wall arc lamp with a transparent tube and the respective major axis lies along the surface of the outer wall of that tube.

13. An apparatus as claimed in claim 11 in which each area or volume source is a water-wall arc lamp with a transparent tube and the respective major axis lies along the surface of the outer wall of that tube.

14. An apparatus as claimed in claim 10 in which there is an inner and an outer circular array, the off-axis ellipsoidal mirrors in the outer circular array being spaced so as to allow the electromagnetic energy from the inner circular array to pass between them.

15. An apparatus as claimed in claim 11 in which there is an inner and an outer circular array, the off-axis ellipsoidal mirrors in the outer circular array being spaced so as to allow the electromagnetic energy from the inner circular array to pass between them.

16. An apparatus as claimed in claim 12 in which there is an inner and an outer circular array, the off-axis ellipsoidal mirrors in the outer circular array being spaced so as to allow the electromagnetic energy from the inner circular array to pass between them.

17. An apparatus as claimed in claim 13 in which there is an inner and an outer circular array, the off-axis ellipsoidal mirrors in the outer circular array being spaced so as to allow the electromagnetic energy from the inner circular array to pass between them.

18. An apparatus as claimed in claim 1 in which there are multiple sources arranged as a circular array on the surface of a cylinder or cone axially symmetric about the axis of symmetry of the eye mirror, each of which sources extends outside the aperture described by the leading edge of the, or the outermost, first stage defining mirror, and is axially symmetric about its own axis of symmetry, an individual further defined mirror axially symmetric about that axis is provided for each such source, and each pair of defining rays whose intersection specifies a point on that individual further defined mirror lie entirely in a respective plane through that axis.

19. An apparatus as claimed in claim 6 in which each area or volume source extends inside the aperture described by the leading edge of the, or the innermost, first stage defined mirror, and is axially symmetric about its own axis of symmetry, and an individual concave off-axis ellipsoidal mirror axially symmetric about that axis is provided for each such source and formed by the rotation about that axis of a portion of an ellipse whose major axis is at a distance from that axis but substantially parallel to that axis.

20. An apparatus as claimed in claim 18 in which each area or volume source extends inside the aperture described by the leading edge of the, or the innermost, first stage defined mirror, and is axially symmetric about its own axis of symmetry, and an individual concave off-axis ellipsoidal mirror axially symmetric about that axis is provided for each such source and formed by the rotation about that axis of a portion of an ellipse whose major axis is at a distance from that axis but substantially parallel to that axis.

21. An apparatus as claimed in claim 18 in which each area or volume source is a water-wall arc lamp.

22. An apparatus as claimed in claim 19 in which each area or volume source is a water-wall arc lamp with a transparent tube and said major axis lies along the surface of the outer wall of that tube.

23. An apparatus as claimed in claim 20 in which each area or volume source is a water-wall arc lamp with a transparent tube and said major axis lies along the surface of the outer wall of that tube.

24. An apparatus as claimed in claim 18 in which each area or volume source extends inside the aperture described by the leading edge of the, or the innermost, first stage defined mirror, and a concave off-axis ellipsoidal mirror is formed by the rotation about the axis of symmetry of the eye mirror of a portion of an ellipse which is inside said aperture and whose major axis lies further from the axis of symmetry of the eye mirror than the sources but substantially parallel to any one of their axes.

25. An apparatus as claimed in claim 24 in which each area or volume source is a water-wall arc lamp with a transparent tube and said major axis lies along the surface of the outer wall of any such tube.

26. An apparatus as claimed in any of claims 6 to 9 or 18 to 25 in which each axially symmetric source is provided with an individual further mirror in the form of a portion of a cylinder axially symmetric about its respective axis which reflects electromagnetic energy which is emitted from that source in a direction other than meridionally outwards, or approximately so, towards such a direction.

27. An apparatus as claimed in any of claims 6 to 9 or 18 to 25 in which each axially symmetric source is provided with an individual further mirror in the form of a portion of a truncated cone axially symmetric about its respective axis which reflects electromagnetic energy which is emitted from that source in a direction other than meridionally outwards, or approximately so, towards such a direction.

28. An apparatus as claimed in any of claims 6 to 9 or 18 to 25 in which each axially symmetric source is provided with an individual further mirror in the form of a parabolic cylinder, whose foci lie on its respective axis, which reflects electromagnetic energy which is emitted from that source in a direction other than meridionally outwards, or approximately so, towards such a direction.

29. An apparatus as claimed in any of claims 6 to 9 or 18 to 25 in which each axially symmetric source is provided with an individual further mirror in the form of a reverse concentrator which reflects electromagnetic energy which is emitted from that source in a direction other than meridionally outwards, or approximately so, towards such a direction.

30. A method of directing electromagnetic energy comprising the steps of:
(a) providing an apparatus as in any of claims 1 to 25 but whose source(s) are not energised; and
(b) emitting electromagnetic energy from the source(s) extending over area(s) or volume(s) in the manner described for the rays thereof in the claim(s) for said apparatus.

* * * * *